US008104028B2

(12) United States Patent
Stoodley et al.

(10) Patent No.: US 8,104,028 B2
(45) Date of Patent: *Jan. 24, 2012

(54) METHOD FOR JIT COMPILER TO OPTIMIZE REPETITIVE SYNCHRONIZATION

(75) Inventors: Mark Graham Stoodley, Ontario (CA); Vijay Sundaresan, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 372 days.

This patent is subject to a terminal disclaimer.

(21) Appl. No.: 12/414,991

(22) Filed: Mar. 31, 2009

(65) Prior Publication Data

US 2009/0235240 A1   Sep. 17, 2009

Related U.S. Application Data

(62) Division of application No. 10/854,873, filed on May 27, 2004, now Pat. No. 7,552,428.

(30) Foreign Application Priority Data

May 30, 2003   (CA) ..................................... 2430383

(51) Int. Cl.
*G06F 9/45* (2006.01)
(52) U.S. Cl. ........ 717/148; 717/140; 717/149; 717/151; 717/154; 717/155; 717/156; 717/159
(58) Field of Classification Search .................. None
See application file for complete search history.

(56) References Cited

U.S. PATENT DOCUMENTS

| 6,144,983 | A   | * | 11/2000 | Klots et al. ..................... 718/104 |
| 6,237,043 | B1  | * | 5/2001  | Brown et al. .................. 719/316 |
| 6,530,079 | B1  | * | 3/2003  | Choi et al. ..................... 717/158 |

OTHER PUBLICATIONS

Diniz et al., "Lock Coarsening: Eliminating Lock Overhead in Automatically Parallelized Object-Based Programs," Springer, 1997.*
Rinard et al., "Eliminating synchronization bottlenecks in object-based programs using adaptive replication," ACM, 1999.*
Aldrich et al., "Static analyses for eliminating unnecessary synchronization from Java programs," ACM, 1999.*
Bogda et al., "Removing unnecessary synchronization in Java," ACM.*

* cited by examiner

*Primary Examiner* — Insun Kang
(74) *Attorney, Agent, or Firm* — Steven M. Greenberg, Esq.; Carey, Rodriguez, Greenberg & O'Keefe

(57) ABSTRACT

Repetitive synchronization in program code is optimized through lock coarsening that is performed subject to a number of constraints. Using a forward pass over the program code followed by a backward pass, region extent bits may be determined that identify the points in the program where object locking can be coarsened. The program code may then be modified to realize coarsened locking regions determined based on the region extent bits. Alternatively, previously determined value numbers may provide much of the information collected by the two passes. In such a case, a single pass over the program code may locate features that limit lock coarsening opportunities. A set of synchronization operations that can be removed may then be determined and used when modifying the program code to coarsen locking regions.

20 Claims, 25 Drawing Sheets

METHOD FOR JIT COMPILER TO OPTIMIZE REPETITIVE SYNCHRONIZATION

CROSS-REFERENCE TO RELATED APPLICATIONS

This application is a Divisional of U.S. application Ser. No. 10/854,873, filed May 27, 2004, now U.S. Pat. No. 7,552,428, entitled "METHOD FOR JIT COMPILER TO OPTIMIZE REPETITIVE SYNCHRONIZATION," which is incorporated herein by reference in its entirety.

BACKGROUND OF THE INVENTION

1. Field of the Invention

The present invention relates to compilers programming languages and, in particular, to compiling code to optimize repetitive synchronization.

2. Description of the Related Art

The Java™ programming language is recognized to provide many benefits to the programmer. Not the least of these benefits relate to the handling of error conditions, support for multiple threads (to be defined hereinafter) and platform independence. Java is a trademark of Sun Microsystems, Inc.

A defined unit of programming code, developed for a particular purpose, has been called a function, a subroutine and a procedure in different programming languages. In the Java programming language, such a unit is called a "method".

Java includes provisions for handling unusual error conditions. The provisions are included in the form of "exceptions", which allow unusual error conditions to be handled without including "if" statements to deal with every possible error condition.

Java also includes provisions for multiple executions streams running in parallel. Such executions streams are called "threads".

One of the desirable qualities of Java, is the ability of Java code to be executed on a wide range of computing platforms, where each of the computing platforms in the range can run a Java virtual machine. However, there remains a requirement that the code run on a particular platform be native to that platform. A just-in-time (J IT) Java compiler is typically in place, as part of an environment in which Java code is to be executed, to convert Java byte code into native code for the platform on which the code is to be executed.

Recent JIT compilers have improved features, such as "method inlining" and "synchronization".

Where a method is called that does something trivial, like add one to an argument and then return the argument, Java programmers have, in the past, been tempted to simply insert the instruction rather than call the method. This act is called "manual method inlining" Such manual method inlining can improve the speed at which the code runs, as the overhead of an instruction that jumps to the called method, as well as the return from the method, is saved. Some JIT compilers have the capability to recognize where method inlining will improve the speed at which code runs and, thus, can automatically inline methods while converting the byte code into native code.

From Venners, Bill, "How the Java virtual machine performs thread synchronization", http://www.javaworld.com/javaworld/jw-07-1997/jw-07-hood.html, in the Java virtual machine (JVM), each thread is awarded a Java stack, which contains data no other thread can access. If multiple threads need to use the same objects or class variables concurrently, the access of the threads to the data must be properly managed. Otherwise, the program will have unpredictable behavior.

To coordinate shared data access among multiple threads, the Java virtual machine associates a lock with each object. A thread needing to lock a particular object, communicates this requirement to the JVM. The JVM may then provide the lock to the thread. When the thread no longer requires the lock, the thread communicates this lack of requirement to the JVM. If a second thread has requested the same lock, the JVM provides the lock to the second thread.

A single thread is allowed to lock the same object multiple times. For each object, the JVM maintains a count of the number of times the object has been locked. An unlocked object has a count of zero. When a thread acquires the lock for the first time, the count is incremented to one. Each time the thread acquires a lock on the same object, the count is incremented. Each time the thread releases the lock, the count is decremented. When the count reaches zero, the lock is released and made available to other threads.

In Java language terminology, the coordination of multiple threads that must access shared data is called synchronization. The Java language provides two built-in ways to synchronize access to data: with synchronized statements or synchronized methods.

Typically, two bytecodes, namely "monitorenter" and "monitorexit", are used for synchronization of blocks within methods. That is, when synchronization operations are required to synchronize a given block, the Java programmer places a monitorenter bytecode before the given block and a monitorexit bytecode after the given block. When the code inserted by the JIT compiler to perform the monitorenter bytecode is encountered by the Java virtual machine, the Java virtual machine acquires the lock for the object referred to by a reference to the object on the stack. If the thread already owns the lock for that object, a count is incremented. Each time the code inserted by the JIT compiler to perform the monitorexit bytecode is executed for the thread on the object, the count is decremented. When the count reaches zero, the lock is released.

In multi-threaded Java programs, synchronization between threads is usually necessary to ensure correct execution. The Java language provides for synchronized methods and synchronized blocks to enable Java programmers to indicate particular sections of code and particular objects that require synchronization between threads to ensure correctness. As a Java JIT compiler optimizes the execution of a Java program, the Java JIT compiler often inlines synchronized methods that are invoked by the method being compiled or by methods that contain synchronized blocks. Because many classes in the Java class library are designed to be safe for use in a multi-threaded program, it is common for programmers to write Java programs that execute synchronization primitives without being aware that they are doing so and certainly without expecting any performance degradation due to repeated synchronization.

Aggressive inlining often results in methods that can require repeated locking and unlocking of the same object (say, object 1 or "O1"), either in a nested fashion (e.g., lock O1 . . . lock O1 . . . unlock O1 . . . unlock O1), or in a sequential fashion (e.g., lock O1 . . . unlock O1 . . . lock O1 . . . unlock O1). The acquisition and release of locks is known to cause execution time to increase over programs using non-synchronized methods. As such, programmers typically look for optimizations. In the first (nested) case, the inner lock and unlock operations can be safely removed, so long as the memory barrier actions dictated by the Java Memory Model occur. In the second (sequential) case, the middle unlock and lock operations can be removed to "coarsen" the synchronized regions in the method.

A more complex example of lock coarsening may be considered in view of five sequential blocks of code: a first block, a second block, a third block, a fourth block and a fifth block. An object may be locked and unlocked within the first block, the second block, the fourth block and the fifth block, while the object is not locked in the third block. Where one strategy of lock coarsening is applied, only one lock and unlock operation is performed. In particular, the object is locked in the first block and unlocked in the fifth block. Note, however, that the object is now locked for the third block, for which the object originally remained unlocked.

We say that the four locked blocks have been coarsened together. This coarsening may improve performance by reducing the number of lock and unlock operations executed by a method, but it can also degrade performance by holding locks longer, since contention (when different threads contend for a lock on a particular object) may increase which can reduce the amount of parallelism exploited by multiple Java threads.

Clearly, improved methods of lock coarsening are required.

BRIEF SUMMARY OF THE INVENTION

Repetitive synchronization in program code is optimized through lock coarsening. The lock coarsening involves collecting information about the program code, analyzing the collected information to determine a set of synchronization operations that may be removed from the code and transforming the code based on the set. The transforming the code includes inserting new synchronization operations where necessitated by the removal of synchronization operations in the determined set of synchronization operations that may be removed. Advantageously, various aspects of the present invention allow for the lock coarsening to be performed while maintaining program correctness and reducing potential performance degradations. Advantageously, the range of operations over which a lock may be held is expanded by the present approach to lock coarsening.

In accordance with an aspect of the present invention there is provided, in a just-in-time compiler of program code, the program code including a plurality of blocks of instructions and the program code, when executed, performing repetitive synchronization on a plurality of objects, a method of optimizing the repetitive synchronization. The method includes considering the program code to collect information about each block of the plurality of blocks, analyzing the information to determine a set of synchronization operations that may be removed and modifying the program code based on the set of synchronization operations that may be removed, where the modifying includes inserting a new synchronization operation where necessitated by removing synchronization operations in the set. In other aspects of the present invention, a just-in-time compiler of program code is provided for performing this method and a computer readable medium is provided to allow a general purpose computer to perform this method.

Other aspects and features of the present invention will become apparent to those of ordinary skill in the art upon review of the following description of specific embodiments of the invention in conjunction with the accompanying figures.

BRIEF DESCRIPTION OF THE SEVERAL VIEWS OF THE DRAWINGS

In the figures which illustrate example embodiments of this invention.

DETAILED DESCRIPTION OF THE INVENTION

Figure 1A:
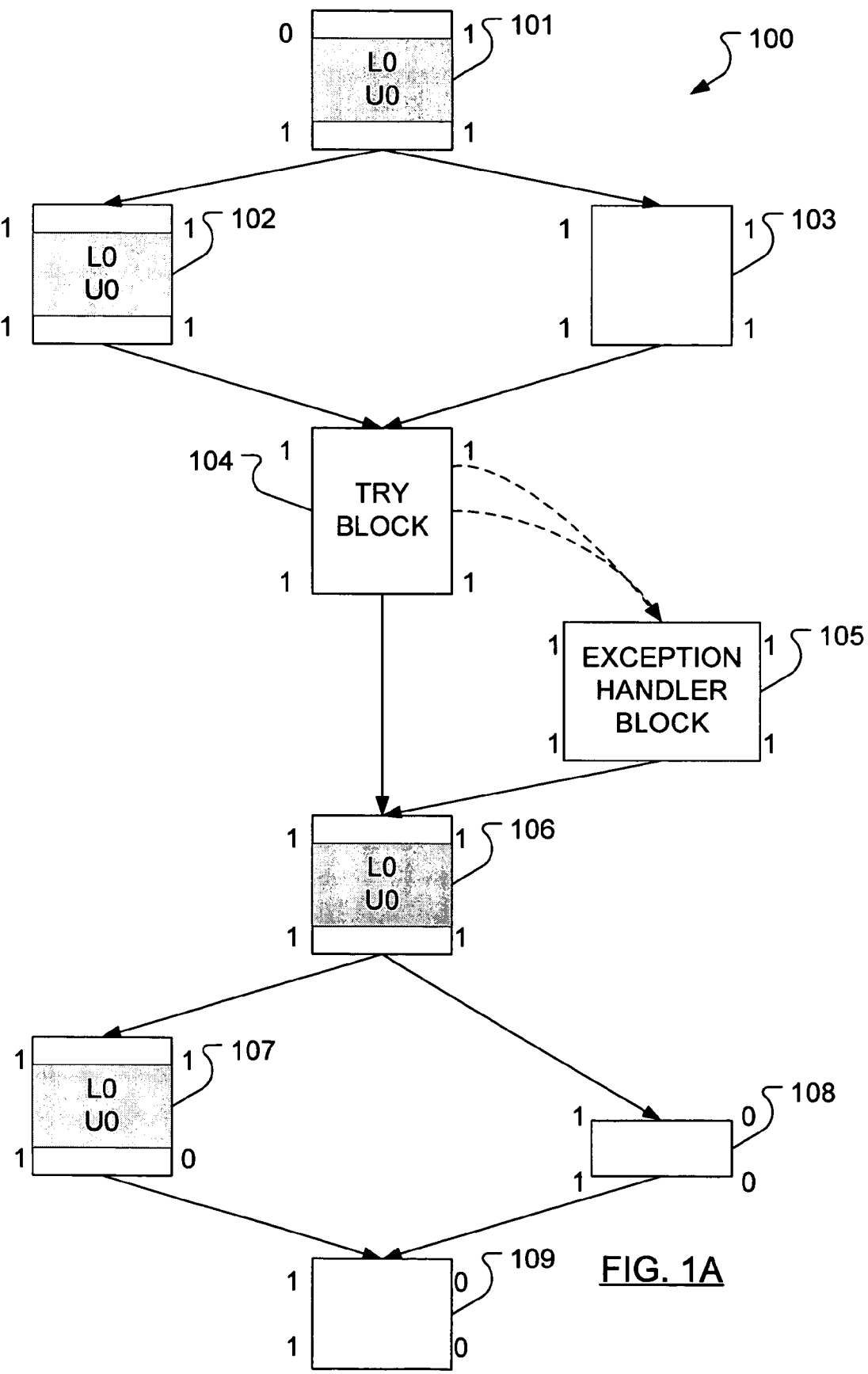
FIG. 1A illustrates an exemplary control flow graph of a method along With region extent bits determined according to an embodiment of the present invention.
Figure 1B:
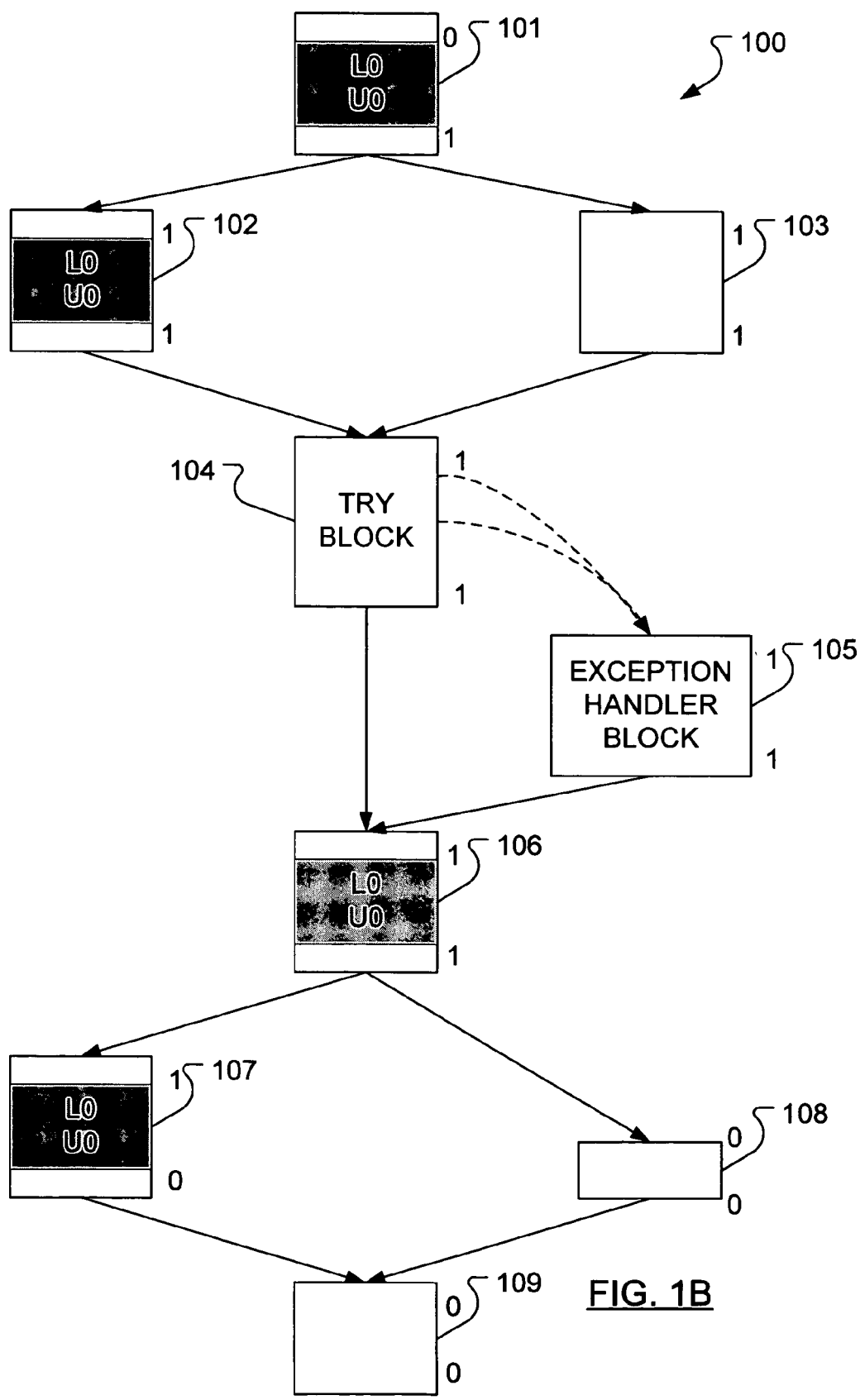
FIG. 1B illustrates the exemplary control flow graph of FIG. 1A with region extent bits coarsened according to an embodiment of the present invention.
Figure 2:
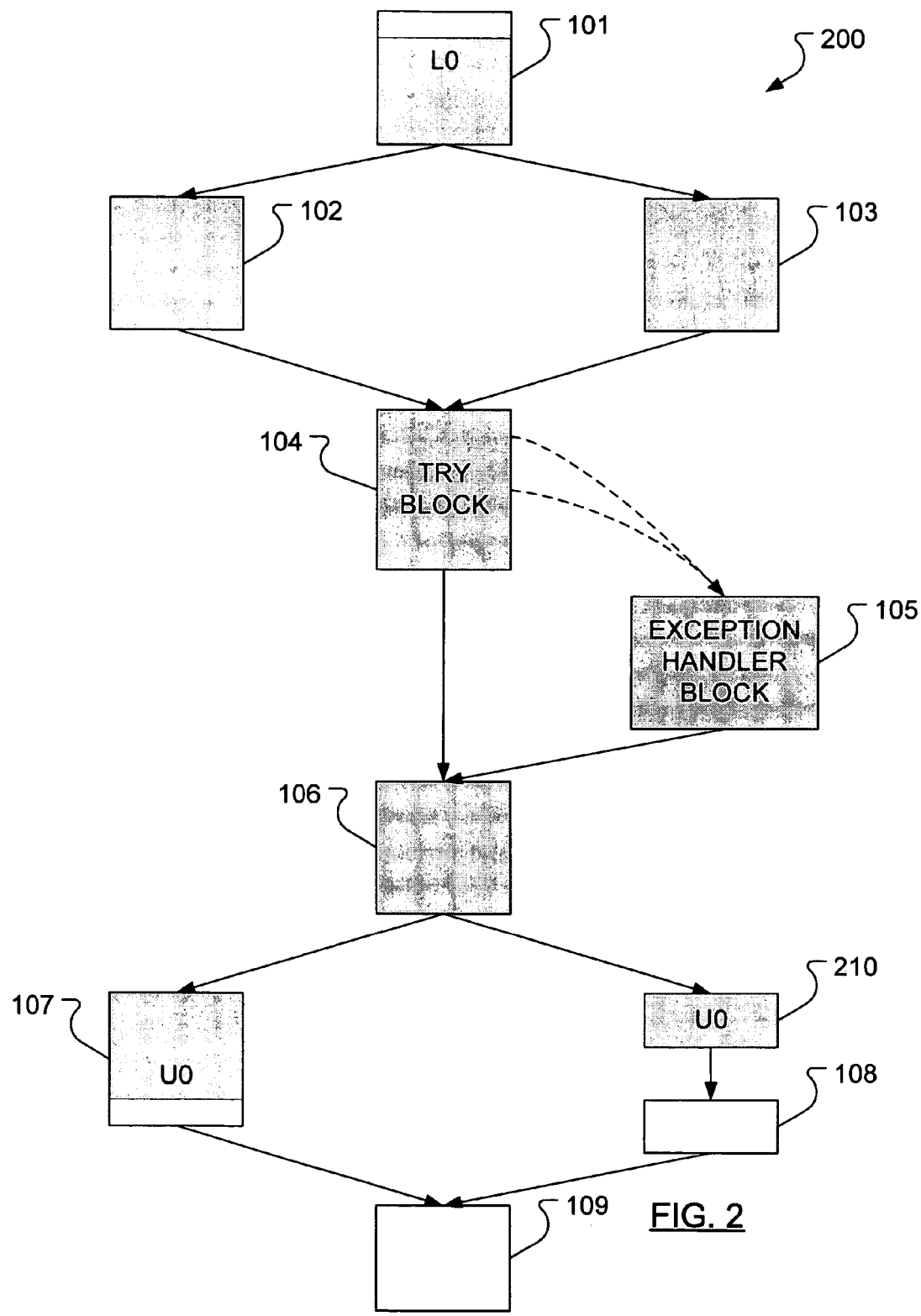
FIG. 2 illustrates the exemplary control flow graph of FIG. 1A wherein locks have been coarsened according to an embodiment of the present invention.

FIGS. 1A, 1B and 2 present an example of lock coarsening. In particular, FIG. 1 illustrates an exemplary control flow graph 100 of a method. Various regions of the method code are represented by blocks 101, 102,103,104,105,106,107, 108 and 109 that are connected by flow edges. Synchronization placement is illustrated by darkened regions within the blocks as an object "0" is locked (L0) and unlocked (U0) in blocks 101,102,106 and 107. During execution, the object 0 may be locked up to four times, depending upon which path through the generic control flow graph 100 is taken.

In overview, aspects of the present invention are directed to considering said the flow graph 100 to collect information about each block. This information is then analyzed to determine a set of synchronization operations that may be removed. The program code is then modified based on the set of synchronization operations that may be removed, where the modifying includes inserting new synchronization operations where necessitated by the removal of the synchronization operations in the set.

FIG. 2 illustrates a coarsened control flow graph 200, representative of the generic control flow graph 100 of FIG. 1, after coarsening. The object 0 is locked in block 101 and unlocked in block 107 (or a new block 210) meaning that the locking and unlocking operations occur exactly once each, regardless of the path executed. As will be described in detail hereinafter, the new block 210 is required to ensure that the object 0 is unlocked along all paths leaving the coarsened region.

Figure 3:
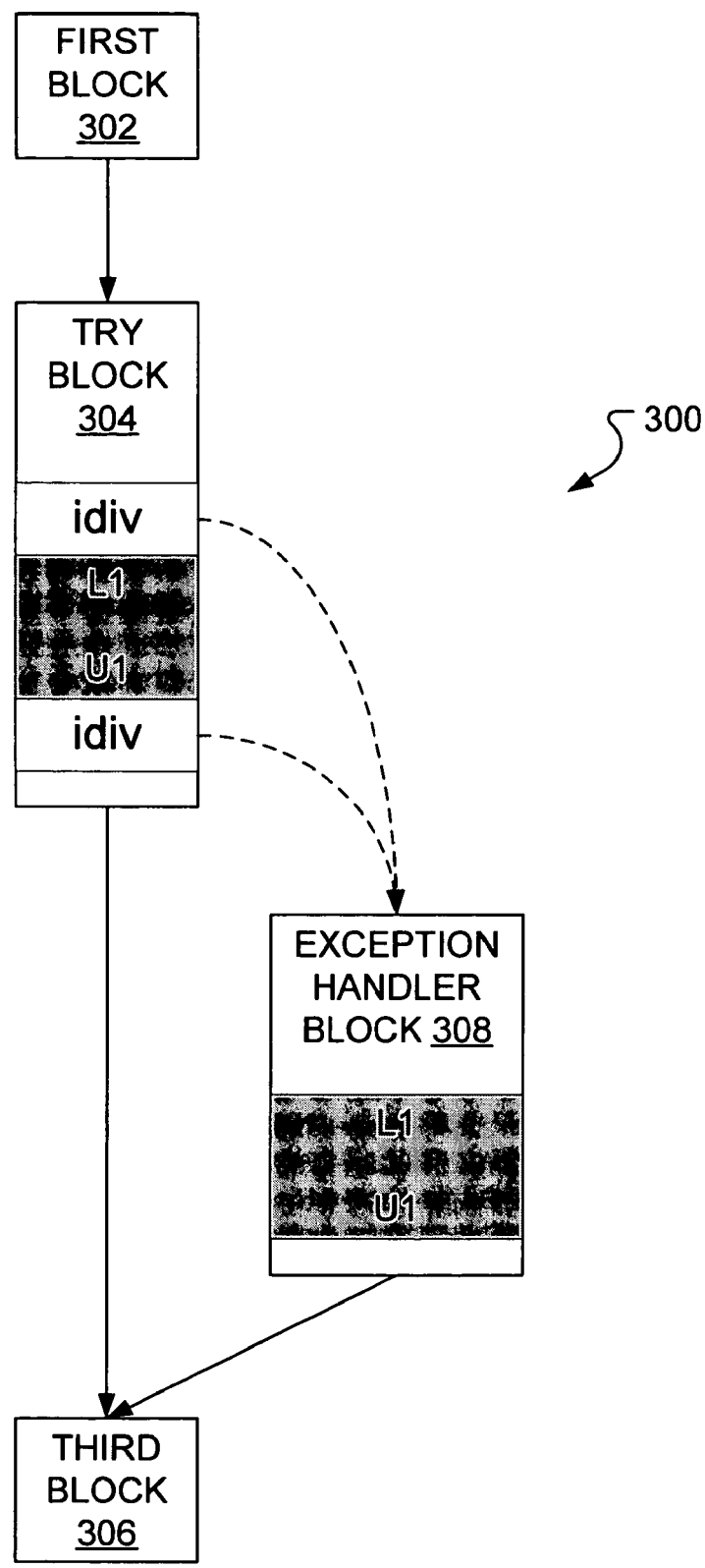
FIG. 3 illustrates an exemplary control flow graph wherein a try block and an exception handler block include regions for synchronizing an object and exception causing instructions surround the synchronizing region in the try block.

FIG. 3 illustrates an exemplary control flow graph 300. In typical execution of the method represented by the exemplary control flow graph 300, a first block 302 is executed followed by a try block 304 and a third block 306. However, if an instruction in the try block 304 throws an exception, control flows to an exception handler block 308. Two instructions capable of throwing an exception are illustrated in the try block 304. Once the exception has been handled by the exception handler block 308, control flows to the third block 306. Both the try block 304 and the exception handler block 308 include regions for synchronizing an object "1". Such synchronizing is represented in FIG. 3 by darkened regions beginning with a locking operation (L1) on the object 1 and ending with an unlocking operation (U1) on the object 1. Notably, one of the instructions capable of throwing an exception in the try block 304 precedes the synchronization of the object 1 (i.e., the locking and unlocking of object 1) and the other of the instructions capable of throwing an exception follows the synchronization of the object 1.

Figure 4:
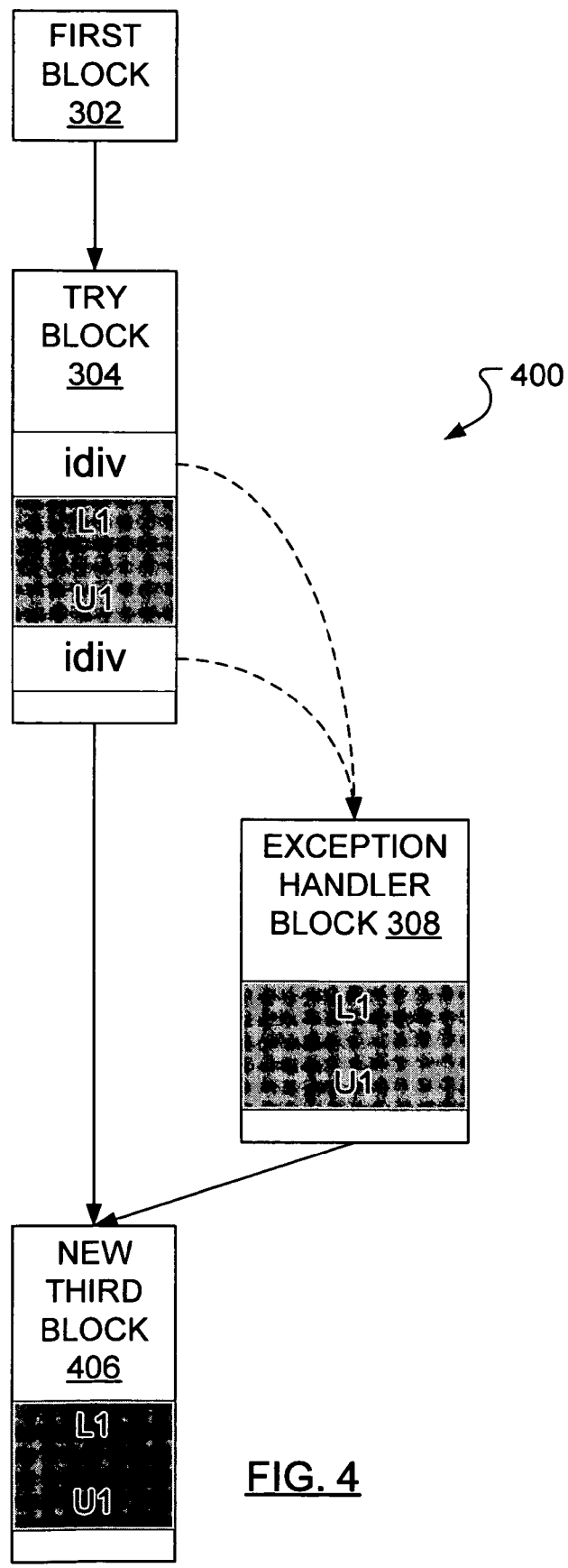
FIG. 4 illustrates an exemplary control flow graph wherein a try block, an exception handler block and a further block include regions for synchronizing an object and exception causing instructions surround the synchronizing region in the try block.

FIG. 4 illustrates another exemplary control flow graph 400, which differs from the exemplary control flow graph 300 of FIG. 3 in that a new third block 406 includes a region for synchronizing object 1.

Figure 5:
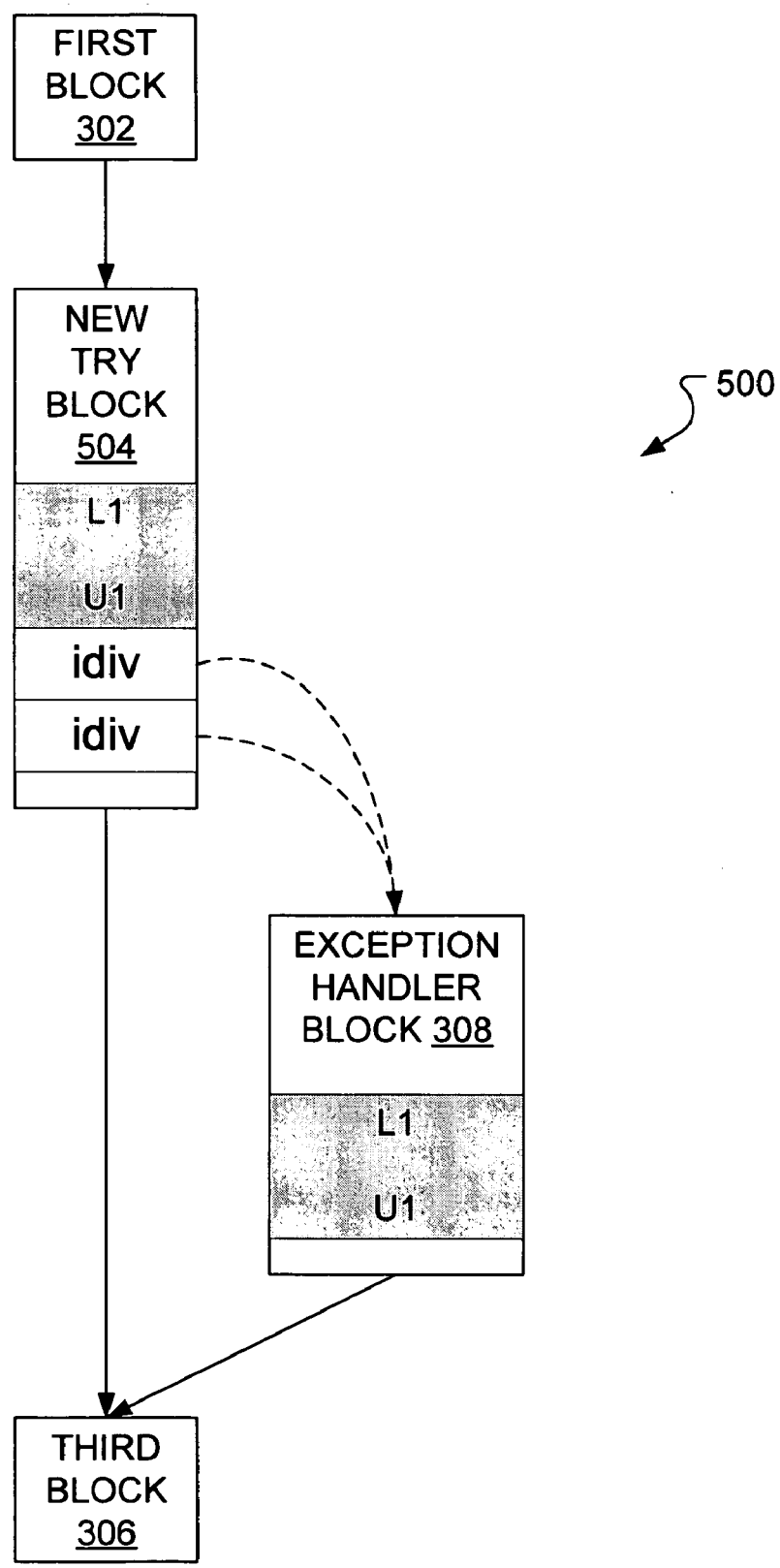
FIG. 5 illustrates an exemplary control flow graph wherein a try block, an exception handler block and a further block include regions for synchronizing an object and exception causing instructions follow the synchronizing region in the try block.

FIG. 5 illustrates a further exemplary control flow graph 500, which differs from the exemplary control flow graph 300 of FIG. 3 in that the instructions in a new try block 504 that are capable of throwing an exception follow the synchronization of object 1, rather than surrounding such synchronization.

A herein-proposed JIT compiler may coarsen object locks according to a set of constraints. A first constraint requires that the lock coarsening adhere to requirements of the Java Memory Model. A second constraint requires that the lock coarsening maintain program correctness. A third constraint requires that the lock coarsening reduce potential performance degradations.

Synchronization optimization that eliminates lock operations or unlock operations in Java programs is subject to limitations that are imposed by the current Java memory model. In particular, one such limitation requires that store instructions executed before and after a synchronization operation must by seen by all threads in the original program order. Many modern central processing units (CPUs) have the ability to issue instructions out of order and a few processors, like the IBM PowerPC® processor, are sufficiently aggressive to reorder store instructions so that two stores executed in a particular order on one processor can be seen by another processor to have been executed in the opposite order. If the two stores instructions (a first store instruction and a second store instruction) write to different locations, then the processor is free to perform this reordering optimization, even if the first store instruction is held up for whatever reason. When such reordering is not acceptable, a SYNC instruction (a known PowerPC instruction) may be inserted between the first store instruction and the second store instruction to force the first store instruction to become visible to all threads before the second store is begun. PowerPC is a registered trademark of the International Business Machines Corporation.

The herein-proposed JIT compiler may implement synchronization using artificial Java bytecodes called "syncenter" and "syncexit" instead of the known monitorenter and monitorexit bytecodes. The introduction of these artificial bytecodes has two main benefits. First, unlike the more general monitorenter and monitorexit bytecodes, syncenter and syncexit operations are hierarchically nested because they are used by the Java programmer in consideration of an invocation inlining tree. It is not possible, in Java, to execute the sequence: call foo( ) call inner_foo( ) return from foo( ) return from inner_foo( ). The syncenter/syncexit operations for the foo( ) method must therefore be placed around the syncenter/syncexit operations for the inner_foo( ) method. That is, the artificial bytecodes may not be interleaved. The second main benefit is that, since these artificial bytecodes cannot occur in known Java class files, the JIT compiler recognizes that every syncexit operation must be balanced by an earlier syncenter operation, and vice versa. Only through an exception that is not handled in the method could a syncexit execute without the corresponding syncenter having executed earlier. Additionally, only through an exception that is not handled in the method could a syncenter acquire a lock that will not be later released by a corresponding syncexit. However, these exceptional cases may be correctly handled by a Java virtual machine (the environment in which such code is executed) that is aware of the syncenter and syncexit operations.

To adhere to the requirements of the Java Memory Model, when the herein-proposed JIT compiler inserts code to implement a syncenter operation or a syncexit operation, a SYNC instruction is included. As such, if, through some optimization such as lock coarsening, the herein-proposed JIT compiler eliminates a syncenter or a syncexit operation, the herein-proposed JIT compiler may be operable to maintain the original order of stores before and after the original location of the eliminated operation for all threads. For processors that have the ability to reorder stores (e.g., the PowerPC processor), the herein-proposed JIT compiler may replace eliminated synchronization operations with an instruction (e.g., the PowerPC SYNC instruction or equivalent) that maintains the correct order of stores for all threads.

To maintain program correctness, the herein-proposed JIT compiler may be operable to avoid performing lock coarsening that results in a situation wherein two objects that were not originally locked simultaneously at any program point are locked simultaneously at any program point. This constraint assists in the preventing of "deadlocks" in the executing code. A set of threads may be considered to be deadlocked when each thread in the set of threads is waiting for an event that only another thread in the set can cause.

Several types of operations, when found between two regions in which a given object is respectively locked, are known to create a deadlock opportunity when the lock on the given object is coarsened for the regions. A first type of operation is a lock or unlock operation on another object. A second type of operation is an operation that includes a reference to a volatile field. Coarsening regions that surround operations of this second type is ill-advised, since volatile fields can be used to implement synchronization directly, that is, without using Java-level synchronized regions or methods.

A deadlock opportunity can also be created when the synchronization of one object is aggressively coarsened without paying attention to the synchronization of other objects. Consider three sequential blocks of code including a first block of code, a second block of code and a third block of code. If two distinct objects are locked and unlocked in the first block of code and the third block of code, but not in the second block of code, and the locks for two objects are coarsened, entry to the second block may provide an opportunity for a deadlock.

To reduce potential performance degradations, the herein-proposed JIT compiler may be arranged to avoid coarsening locks on a given object in situations wherein the length of time for which a coarsened lock on the given object will be held is difficult to predict. The longer a lock on the given object is held, the more contention from other threads for the lock on the given object. Performance is degraded by coarsening in such situations, rather than improved.

In a first such situation, a loop structure intervenes two regions that lock and unlock a given object. As it is difficult for a JIT compiler to predict the length of time that a loop will execute, it is difficult to predict how long the given object will be locked if the lock on the given object is coarsened.

In a second such situation, a method invocation intervenes two regions that lock and unlock a given object. As it is difficult for a JIT compiler to predict the length of time that a method will execute, it is difficult to predict how long the given object will be locked if the lock on the given object is coarsened.

In a third such situation, a reference to an unresolved field intervenes two regions that lock and unlock a given object. As it is difficult for a JIT compiler to predict the length of time that will be required to resolve the field, it is difficult to predict how long the given object will be locked if the lock on the given object is coarsened.

Furthermore, within a given loop, the herein-proposed JIT compiler may be arranged to only coarsen locks between blocks that are at the same loop nesting depth (i.e., locks are not coarsened between a block in an outer loop and a block in an inner loop) and locks that are inside the same loop.

In addition to the above-described constraints, heuristics may be used by the herein-proposed JIT compiler to limit the scope of coarsening so that a lock is not held across too long a sequence of straight-line code.

In operation, the herein-proposed JIT compiler selects locking operations to consider as candidates for coarsening and distinguishes between synchronization based on the inlining of synchronized methods and synchronization based on explicit synchronized blocks of code written by the Java programmer.

The first form of synchronization, based on the inlining of synchronized methods, is represented in the code using the artificial syncenter and syncexit operations, which do not appear in Java classfiles. The second form of synchronization, based on explicit synchronized blocks of code, is represented in the code using the monitorenter and monitorexit bytecodes, which are defined by the Java virtual machine specification. While monitorenter and monitorexit bytecodes can potentially be unmatched in a maliciously constructed class file, syncenter and syncexit operations must be correctly matched because they only result from automatic inlining of synchronized methods.

For this primary reason, both of the two lock coarsening implementations described hereinafter only target syncenter and syncexit operations. A second reason is that explicit monitorenter and monitorexit bytecodes are far less likely to be encountered than syncenter and syncexit operations due to the aggressive amount of inlining performed by the JIT compiler.

The implementations described in this disclosure correctly address all three constraints described above so that the Java memory model is adhered to, deadlock opportunities are not created and lock contention is not significantly increased. Note that, because a JIT compiler executes at the same time as the Java program being compiled, it is preferred that the optimization of synchronization execute efficiently, so that the gains achieved are not diminished by the cost of performing the optimization. Advantageously, the two implementations described hereinafter employ computationally efficient algorithms that can significantly reduce the number of locking operations performed by a Java method and thus effectively improve the performance of a wide variety of Java programs.

Figure 6:
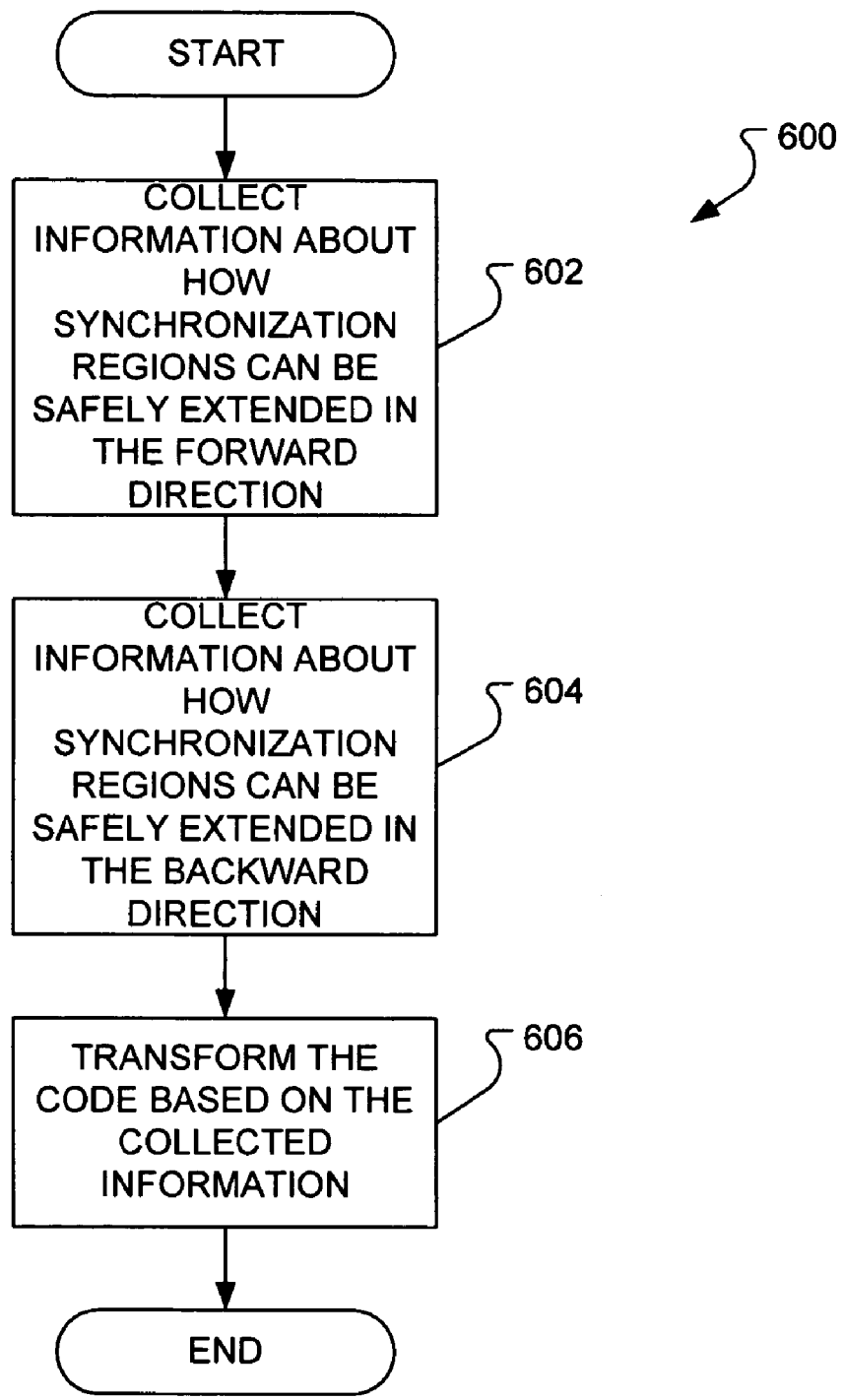
FIG. 6 illustrates the steps of a first lock coarsening method according to an embodiment of the present invention.

A first lock coarsening implementation, broadly illustrated in FIG. 6, passes over the code twice and then transforms the code using the results of the two passes. In the first pass (step 602), information is collected about how synchronization regions can be safely extended in the forward direction. In the second pass (step 604), information is collected about how synchronization regions can be safely extended in the backward direction. The result of each of these two passes is a set of region extent bits that indicate precisely which blocks in a method can be safely and profitably locked by coarsening the original locking operations. The code is then transformed (step 606) to coarsen the locking operations in regions where possible.

The first pass over a given method propagates synchronized regions forward through all possible flow edges in a control flow graph of the given method, including both normal and exceptional edges, to detect situations where two or more regions can be safely coalesced, i.e., where a lock may be coarsened for the two regions. The propagation is accomplished using a set of flags, called forward region extent bits, which indicate, for each synchronized object referenced by the method, whether an earlier locking operation has been performed on that object. For a given block of code, the set of forward region extent bits are determined at the input to the given block and then determined for each instruction in the given block such that the set of forward region extent bits may be determined at the output of the given block.

As will become apparent hereinafter, determining the forward region extent bits requires the detection of the unlocking of a particular object. To detect whether an object is locked, an indication of a current "synchronization depth" for each object is maintained during the forward pass. When a syncenter operation for a given object is encountered, the synchronization depth of the given object is incremented. When a syncexit operation for a given object is encountered, the synchronization depth of the given object is decremented. At any point in the method, if the current synchronization depth for a given object is zero, then the given object is considered to be unlocked. The synchronization depths are maintained along flow edges and checked for consistency at the beginning of each basic block. If an inconsistency is detected (if, say, two paths having different synchronization depths for the same object reach the same block), then, as a safety measure, the object is marked as uncoarsenable. This point is discussed in more detail hereinafter.

For all blocks but exception handler and finally entry blocks, the input forward region extent bits of a block "B" are computed by logically ORing the set of forward region extent bits at the output of the blocks preceding block B (called the predecessor blocks of block B). ORing the forward region extent bits may result in an aggressive coarsening, since a given block can become part of a region with a coarsened lock on a particular object, even if the given block has some predecessor blocks that do not lock the object. One of the actions performed during the transformation step of the first lock coarsening implementation is an insertion of syncenter operations along these predecessor edges to ensure that the object is always locked upon entry to the coarsened region.

Rather than the logical OR operation used for normal blocks, the forward region extent bits are logically ANDed for the predecessor blocks of exception handler blocks and finally entry blocks. For an exception handler block, the predecessor blocks are part of a try region for the exception handler block. These predecessor blocks include the instructions that might cause an exception. For finally entry blocks, the predecessor blocks are the blocks ending in Jump to SubRoutine (JSR) bytecodes whose destination is the finally entry block.

ANDing the forward region extent bits for exception handler blocks and for finally entry blocks is necessary to ensure program correctness. If an object is locked in a control flow path that leads to an exception handler block via one exception-causing instruction but the same object is not locked in another control flow path that leads to the exception handler block via another exception-causing instruction (see FIG. 3 and FIG. 4), then it cannot be anticipated whether, in execution, the object will have been locked when the exception handler block is reached. While, for normal flow edges, it is possible to insert a syncenter when the object has not been locked, it may be a considerable amount of work to insert syncenter operations along exceptional edges. Furthermore, new try blocks and exception handler blocks would be needed. Without evidence that missing such a coarsening opportunity significantly degrades performance, this first implementation simply ensures program correctness by logically ANDing the forward region extent bits at the input to exception handler blocks and finally entry blocks. Using the logical AND permits coarsening in control flow situations like that illustrated in FIG. 5.

Although the predecessor blocks of a given block are the main source of information from which the forward region extent bits are determined at the input to the given block, the forward region extent bit for a particular object may be cleared (1) if the given block is the header for a loop, or (2) if paths having different synchronization depths reach the given block via different predecessor blocks.

Because loops can execute for a long time, it is preferable not to allow a synchronized region to extend into a loop, except in one situation. If an object is already locked at the entry point to the loop, then we allow the region extent bit to stay set at the header for the loop. The reason for this is to permit nested synchronization within the loop to be eliminated. If the object is locked outside the loop and inside the loop, then allowing the forward region extent bits to propagate into the loop enables us to coalesce the two (nested) synchronized regions.

The second condition involving different synchronization depths is, however, a more serious one. If paths having different synchronization depths reach the input to a block via different predecessor blocks, it may be considered that a single pass traversal of the control flow graph of the method does not gather sufficient information. An example where the first implementation may not be able to capture all the control flow paths of the method is known as "obfuscated code", wherein many superfluous control flow edges are created in a method to obscure the true behavior of the method. A full dataflow analysis would be required to fully capture the control flow paths of the method but, in general, a full dataflow analysis is more compile-time intensive than the approach used by the first implementation. If paths having different synchronization depths for an object do reach the input to a block, coarsening for the object is disabled, because a determination may not be easily made as to whether coarsening the object is legal. Coarsening is allowed or disallowed with an object-level granularity. Disabling coarsening of locks on a first object, therefore, does not prohibit coarsening of locks on a second object so long as the synchronization behavior may be correctly captured for the second object.

Once the forward region extent bits have been computed at the input to a basic block, the bytecodes in the block may be visited in program order to propagate the forward region extent bits towards the output of the block. There are four types of bytecodes that may prohibit propagation of an extent bit for a given object: 1) method invocations, 2) accesses (e.g., a GETFIELD bytecode, a PUTSTSTATIC bytecode) to volatile or unresolved fields, 3) bytecodes that redefine the local variable holding a reference to the given object, and 4) a syncenter or syncexit operation on another object. Encountering any of these bytecodes results in a clearing of the extent bit for each currently unlocked object. By only applying these barriers to unlocked objects, the implementation ensures that all bytecodes that were originally locked will remain locked after coarsening; the forward region extent bits are set in all blocks for which the object was originally locked by the method. Of course, the forward region extent bits may also be set in blocks for which the object was not originally locked, if it is legal and profitable to coarsen some synchronized regions.

Whenever a syncenter operation is encountered, it is added to a list of coarsenable locking operations if the forward region extent bit for the object it locks is already set. Note that the bytecode is not removed at this point since either of the first or second passes could subsequently determine that this object cannot be legally coarsened, in which case the syncenter operation must be left as-is. The transformation step of the implementation, described below, performs the actual transformation of the code to create the new coarsened regions.

There are three outputs of the first pass. The first is a set of forward region extent bits for each basic block B indicating whether there is a synchronized region for each object that could be extended in a forward direction to basic block B's input and output. The second output of the first pass is the list of coarsenable locking operations identified by the pass. The third output is a set of bits indicating objects, locks on which the pass has identified as not legally coarsenable.

Figure 7A:
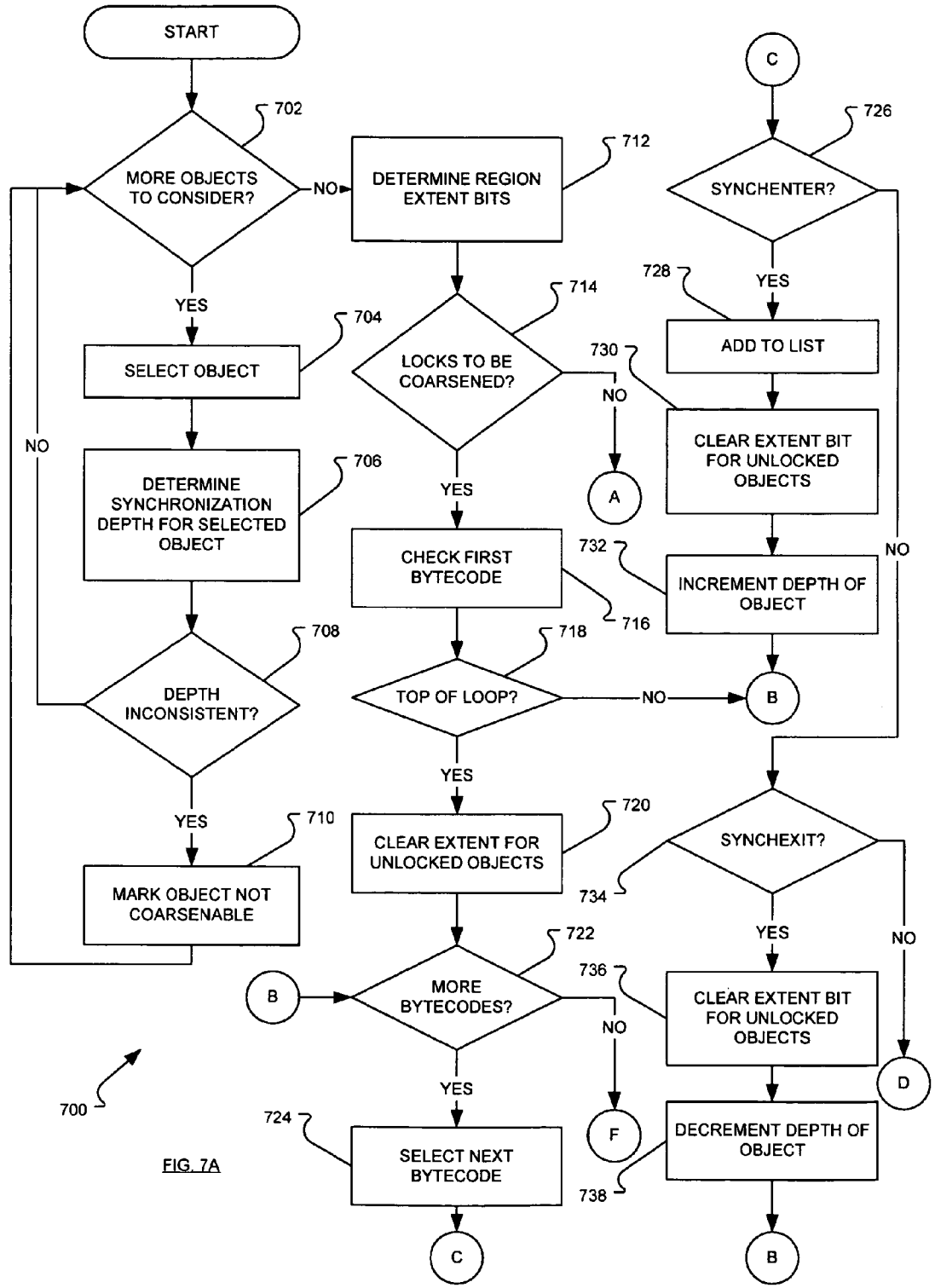
FIG. 7A illustrates an expansion of the steps in the first step of the method of FIG. 6 according to an embodiment of the present invention.
Figure 7B:
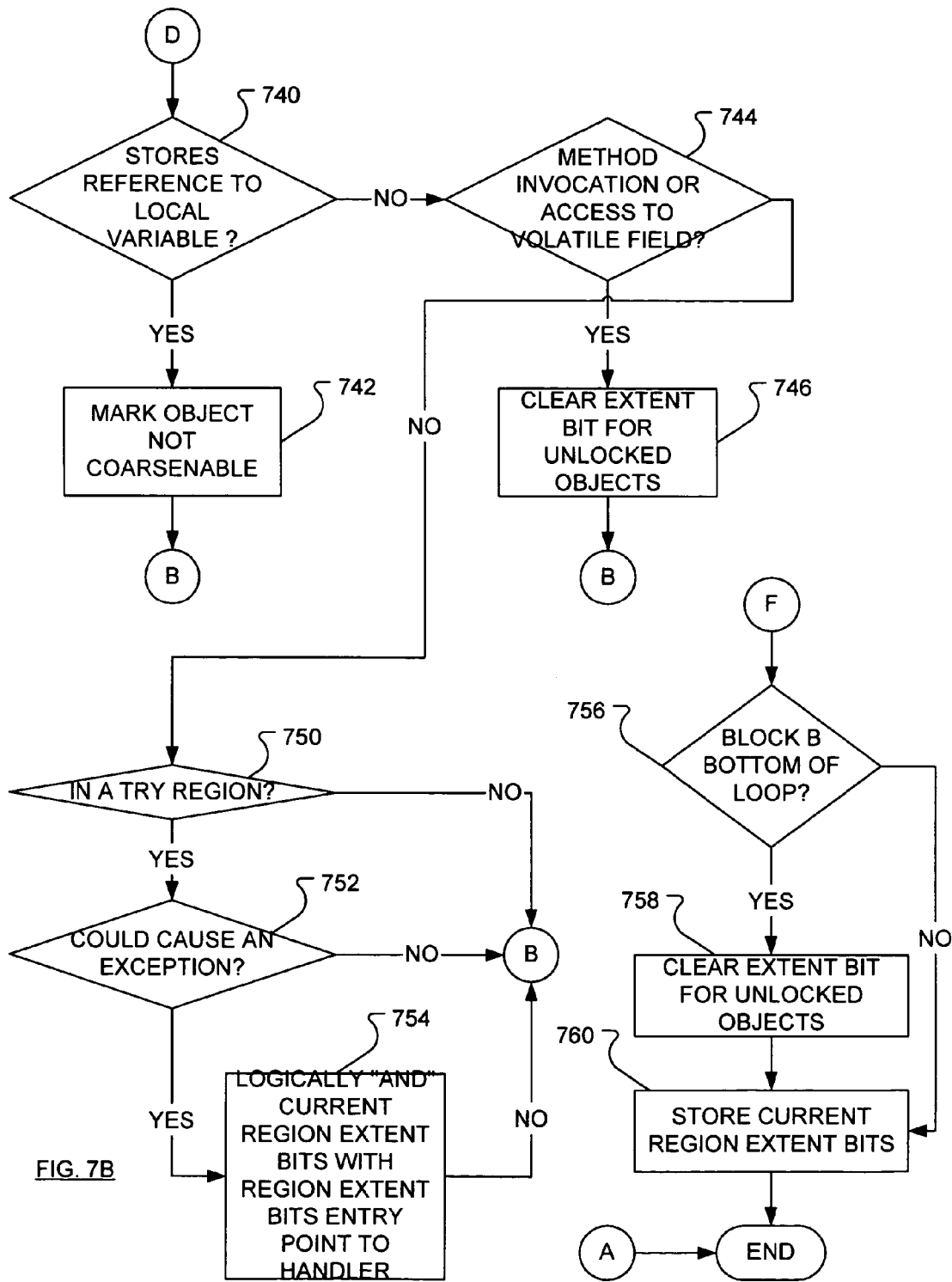
FIG. 7B illustrates a continuation of the steps of FIG. 7A according to an embodiment of the present invention.

An outline of the high-level steps in the first pass over a given block B in a given method is presented in FIGS. 7A and 7B. Initially, each object that has been visited in a predecessor block of block B is individually considered. Beginning in FIG. 7A, an object to consider is selected (step 704) and the synchronization depth for the selected block is then determined (step 706) for the various predecessor blocks. If it is determined (step 708) that the depths from different predecessor blocks are inconsistent for the selected object, the selected object is marked as "not coarsenable" (step 710). Subsequently, it is determined whether there are further objects to consider (step 702). Additionally, if it is determined (step 708) that the depths from different predecessor blocks are consistent for the selected object, it is determined whether there are further objects to consider (step 702).

Once all objects have been considered, the input forward region extent bits for block B are determined (step 712) by logically ORing the output forward region extent bits of the predecessor blocks of block B. It is then determined whether there are any locks to be coarsened (step 714). If there are locks to be coarsened, the fist bytecode of block is checked (step 716). It is determined (step 718) whether the first bytecode is the top of a loop by testing for unvisited predecessor blocks. If it is determined that the first bytecode is the top of a loop, the forward region extent bits of unlocked objects are cleared (step 720).

If it is determined (step 722) that there are more bytecodes to consider, the rest of the bytecodes of block B are then considered in forward (program) order. The next bytecode is then selected (step 724). If it is determined (step 726) that the selected bytecode is a syncenter, the syncenter operation is added to a list of coarsenable locking operations (step 728) as long as another synchronized region for the object locked by the syncenter operation does not reach the syncenter. At the point of the syncenter operation, the forward region extent bit is cleared (step 730) for all unlocked objects and the depth of the object locked by the syncenter is incremented (step 732). It is then determined (step 722) whether there are more bytecodes to consider.

If it is determined (step 726) that the selected bytecode is not a syncenter, it is determined (step 734) whether the selected bytecode is a syncexit. If it is determined (step 734) that the selected bytecode is a syncexit, the forward region extent bit for all currently unlocked objects is cleared (step 736) and the depth of the object locked by the syncenter is decremented (step 738). It is then determined (step 722) whether there are more bytecodes to consider.

If it is determined (step 734) that the selected bytecode is not a syncexit, the selected bytecode is examined to see if locked regions can be extended. For instance, it is determined (step 740, see FIG. 7B) whether the selected bytecode stores a reference to a local variable used by a lock operation in the given method. If it is determined that the selected bytecode performs such a store, the object is marked (step 742) as not coarsenable, unless all such lock operations are dominated by the selected bytecode. It is then determined (step 722) whether there are more bytecodes to consider.

Additionally, if it is determined (step 744) that the selected bytecode is a method invocation or accesses a volatile field, the forward region extent bits are cleared (step 746) for unlocked objects. It is then determined (step 722) whether there are more bytecodes to consider.

Furthermore, if it is determined (step 750) that the selected bytecode is in a try region and, further, it is determined (step 752) that the selected bytecode could cause an exception, the current forward region extent bits are logically ANDed with the entry point forward region extent bits at the handler for each exception. (Note that the entry point forward region extent bits for handlers and finally entry blocks are initialized to 1.) It is then determined (step 722) whether there are more bytecodes to consider. It is also determined (step 722) whether there are more bytecodes to consider where the selected bytecode is not in a try region, or where the selected bytecode could not cause an exception.

If it is determined (step 722, FIG. 7A) that there are no more bytecodes to consider, it is then determined (step 756, FIG. 7B) whether block B is at the bottom of a loop by testing for a successor block that dominates block B. If it is determined that block B is at the bottom of a loop, the forward region extent bits are cleared (step 758) for unlocked objects. Subsequently, and where block B is determined not to be at the bottom of a loop, the current forward region extent bits are stored as the output forward region extent bits for block B. The first pass over block B is then considered complete.

The second pass determines a set of flags, called backward region extent bits, which indicate, for each synchronized object referenced by the method, whether a later unlocking operation will be performed on that object. The output backward region extent bits are determined for a given block by logically ORing the input backward region extent bits of the successor blocks of the given blocks. The output backward region extent bits resulting from this operation are then propagated backwards through the bytecodes of the given block to determine the backward region extent bits at the input of the block. When a syncexit operation is encountered with the backward region extent bit set for the object that is unlocked by the syncexit operation, the syncexit operation is added to a list of coarsenable unlocking operations.

While the second pass operates similarly to the first pass, there are two important differences in which the second (backward) pass takes into account the results of the first (forward) pass to operate correctly.

The first difference is a detection of situations wherein lock coarsening for two regions can create a potential deadlock situation, a problem introduced hereinbefore. Consider an exemplary control flow graph 800 illustrated in FIG. 8, wherein an upper left block 801 and an upper right block 802 both lead to a middle block 803. From the middle block 803 control may pass to either a lower left block 804 or a lower right block 805. An object "0" is synchronized in both the upper left block 801 and the lower left block 804 while an object "1" is synchronized in both the upper right block 802 and the lower right block 805. Neither object is synchronized in the middle block 803. The first (forward) pass detects that both objects will have been previously locked when the middle block 803 is executed. The second (backward) pass similarly detects that both objects are unlocked subsequent to the execution of the middle block 803. If locks on both objects are coarsened, a deadlock opportunity is created. One solution to this problem is to add a restriction that only one region extent bit can be set in the region extent bits at any program point. However, it is believed that such a solution is too conservative, since such a restriction would require that the first (forward) pass decide that a lock on one of the objects could not be extended through the middle block 803. Unfortunately, information is unavailable to the first (forward) pass, when considering the middle block 803, as to whether object 0 or object 1 will be later locked. If only one of the objects is later locked, then extension of the lock on only one of the objects will be necessary and no deadlock opportunity exists. It is only if there are both earlier and later locked regions for both objects that the deadlock opportunity can be created. It is only when the second (backward) pass reaches the exit (input) of the middle block 803 that the information has been collected to properly identify this deadlock opportunity, since both the forward and backward region extent bits are available at that point. If it is found that locks on both objects are available for coarsening, the lock on one object is selected for coarsening and coarsening is prohibited for locks on the other object.

While it may be preferred to only prohibit coarsening locally at the middle block 803, such local coarsening prohibition is unavailable because the syncenter operations in the lower left block 804 and the lower right block 805 have already been added to the list of coarsenable operations during the first (forward) pass. The determination of the exact set of operations to remove from the coarsenable operation list to enable local coarsening prohibition is not trivial and it is believed that this situation is rare enough that the benefit of locally prohibiting coarsening at the middle block 803 is not worth the extra effort required. For this reason, the object with the greatest number of synchronization operations in the method is selected for lock coarsening at the middle block 803. This particular object is selected for providing as the greatest number of lock coarsening opportunities. The remaining objects that could be coarsened at the middle block 803 are marked as uncoarsenable.

The second difference is that, at exception handler blocks and finally entry blocks, the backward region extent bits at the input to the block are masked (logically ANDed with) by the forward region extent bits at the input to the block. Since the forward region extent bits contain only those objects that are guaranteed to be locked when this block executes (see the description of the first pass), this masking ensures that only those objects will be extended backwards through the exceptional edges. Without such masking, syncexit operations preceding some exception-causing instructions might be added to the list of coarsenable operations because a syncexit operation for a given object may be encountered with the backward region extent bit for the given object set, even though it is not legal to coarsen these operations.

Furthermore, to simplify the later transformation step, the backward region extent bits for the output of a block in a try region are calculated in a slightly inaccurate manner. The backward region extent bits at the outputs of blocks in a try region are determined as described earlier except that the backward region extent bits for the exception handler entry blocks for that try region are included even though there is no path from the end of a block in a try region to an exception handler block. In truth, the backward region extent bits for the exception handler blocks should only be merged into the backward region extent bits of the block at exception-causing instructions. We use this slight inaccuracy to simplify the later insertion of syncexit operations along execution paths that exit a coarsened region.

Figure 9:
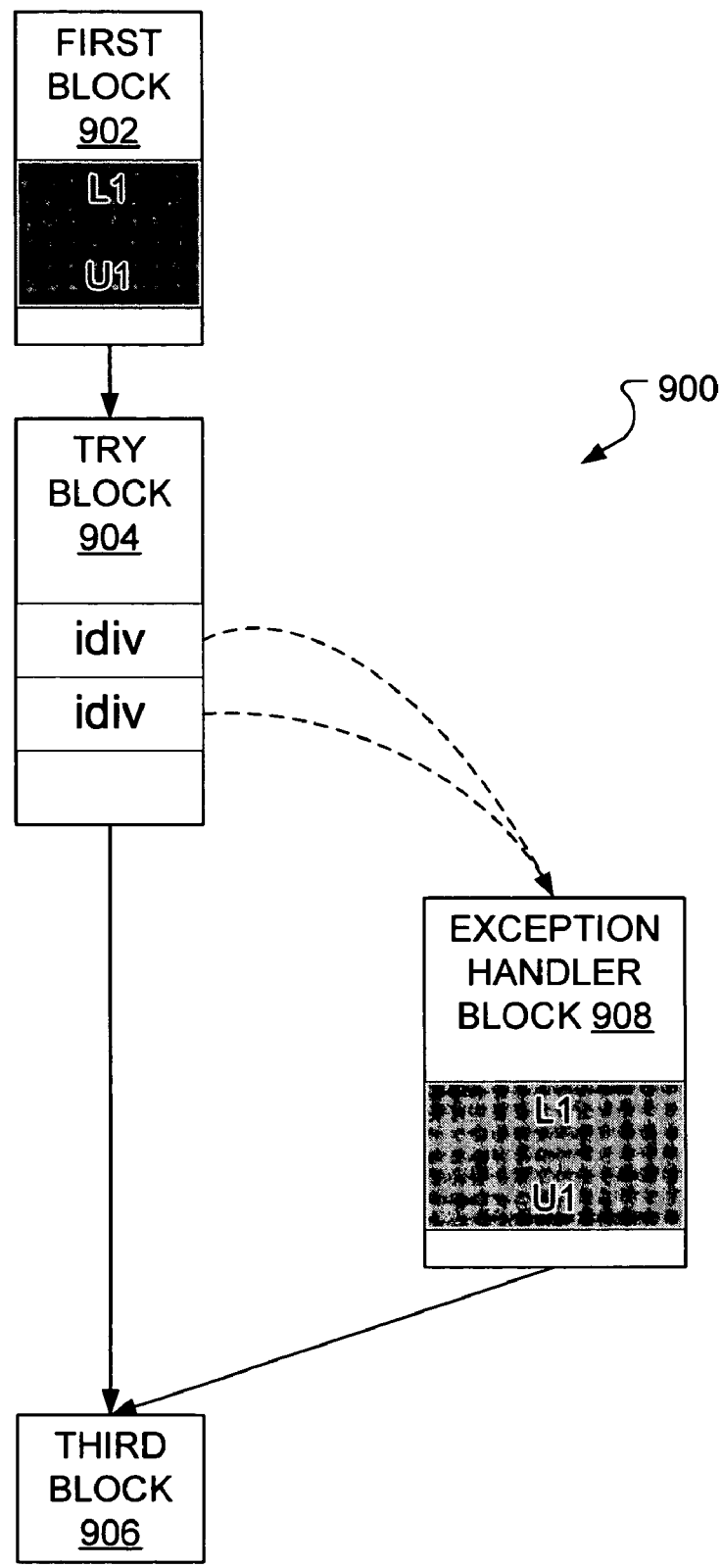
FIG. 9 illustrates an exemplary control flow graph wherein an objects is locked before a try block and in an exception handler block associated with the try block.

In normal execution of the method represented by an exemplary control flow graph 900, illustrated in FIG. 9, a first block 902 is executed followed by a try block 904 and a third block 906. However, if an instruction in the try block 904 throws an exception, control flows to an exception handler block 908. Two instructions capable of throwing an exception are illustrated in the try block 904. Once an exception has been handled by the exception handler block 908, control flows to the third block 906. Both the first block 902 and the exception handler block 908 include regions for synchronizing an object "1". Such synchronizing is represented in FIG. 9 by darkened regions beginning with a locking operation (L1) on the object 1 and ending with an unlocking operation (U1) on the object 1.

Figure 10:
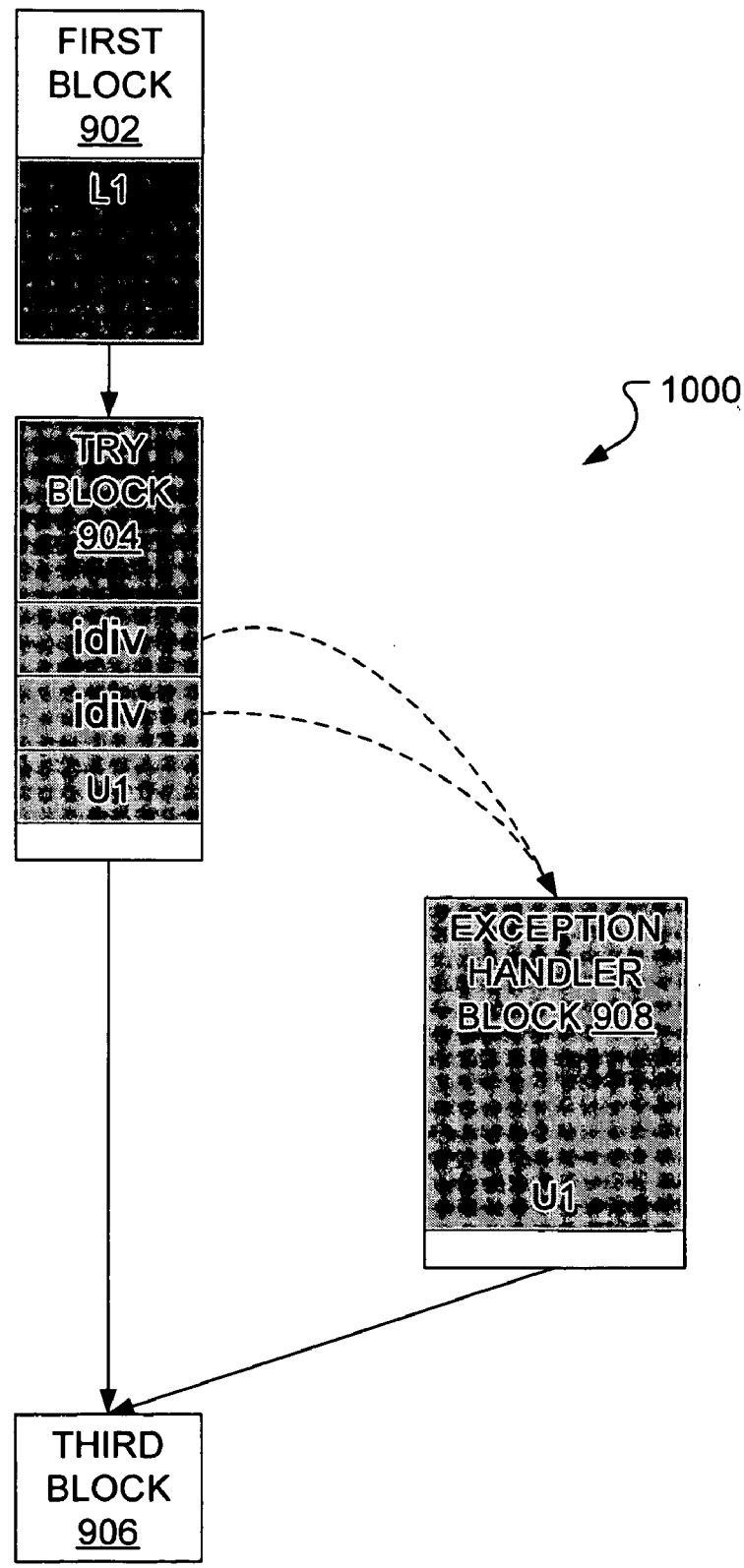
FIG. 10 illustrates an ideal coarsening of the locks on the object multiply locked in the exemplary control flow graph FIG. 9.

In an exemplary control flow graph 1000, illustrated in FIG. 10, the exemplary control flow graph 900 of FIG. 9 is adapted to include a coarsened region for synchronizing object 1 that begins in the first block 902 and extends through the try block 904 into the exception handler block 908.

Figure 11:
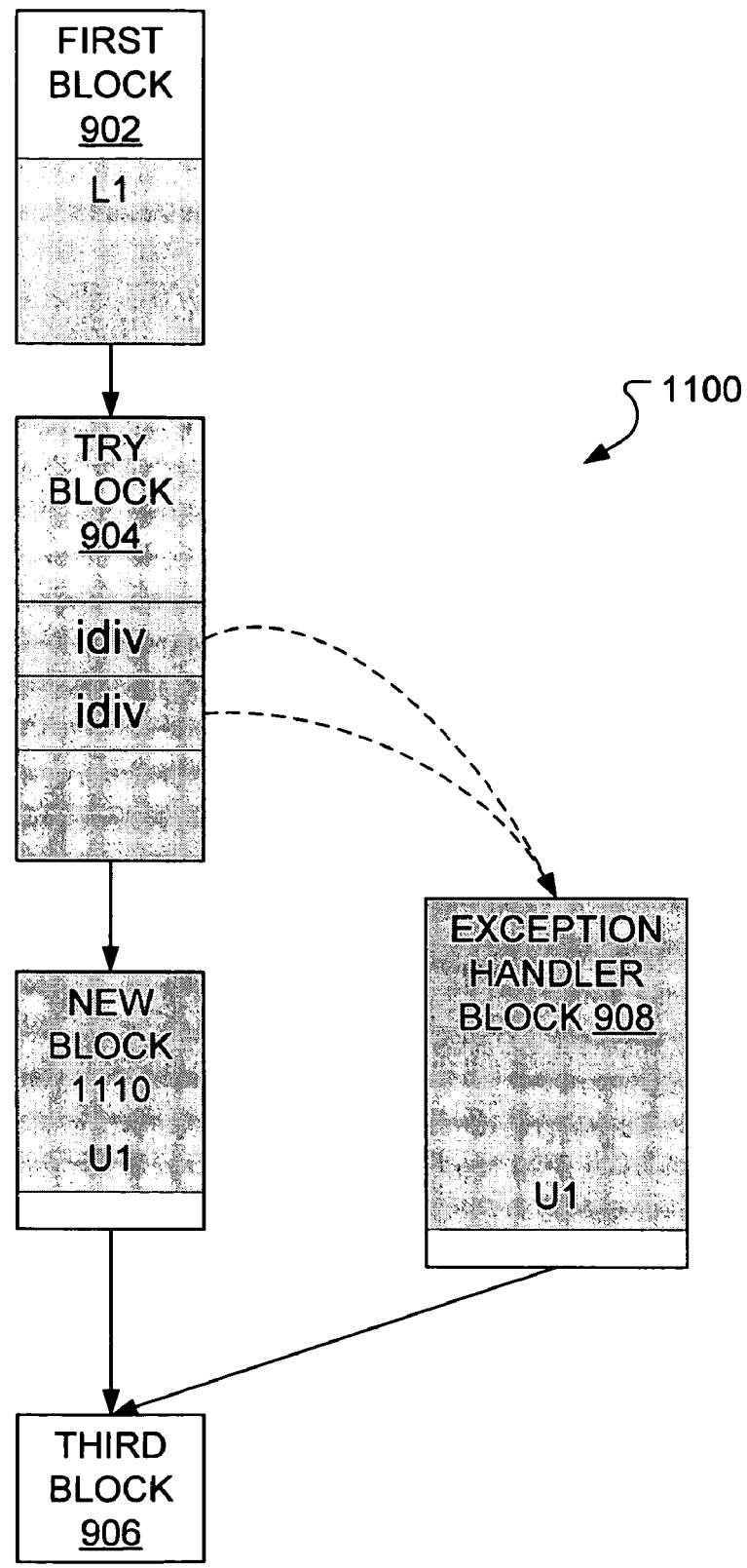
FIG. 11 illustrates the addition of a new block to the exemplary control flow graph of FIG. 9 to coarsen the locks according to an embodiment of the present invention.

In an exemplary control flow graph 1100, illustrated in FIG. 11, the exemplary control flow graph 900 of FIG. 9 is adapted to include a coarsened region for synchronizing object 1 begins in the first block 902 and extends through the try block 904 into both a new block 1110 and the exception handler block 908.

Where synchronization occurs preceding a try block and in the exception handler block associated with the try block, but not along the normal flow out of the try block (as illustrated in FIG. 9), locks on the object may be coarsened to extend into the try block from the first block and out through the exceptional edges (into the exception handler block). In such a case, the object must be unlocked along the normal flow. The point at which the coarsened region most accurately should end is following the last exception-causing instruction(s) in the try block (as illustrated in FIG. 10). However, rather than require the transformation step of the first implementation to determine the precise location at which a syncexit operation should be inserted in the try block 904, the inaccurate computation of the backward region extent bits at the output of the try block 904 forces the location at which a syncexit operation should be inserted to be the end of the try block 904. In this way, the transformation step (step 606, FIG. 6) can simply insert the syncexit operation along the normal flow edges leaving the try block 904 (as illustrated by new block 1110 in FIG. 11), which is a much simpler task.

Figure 12A:
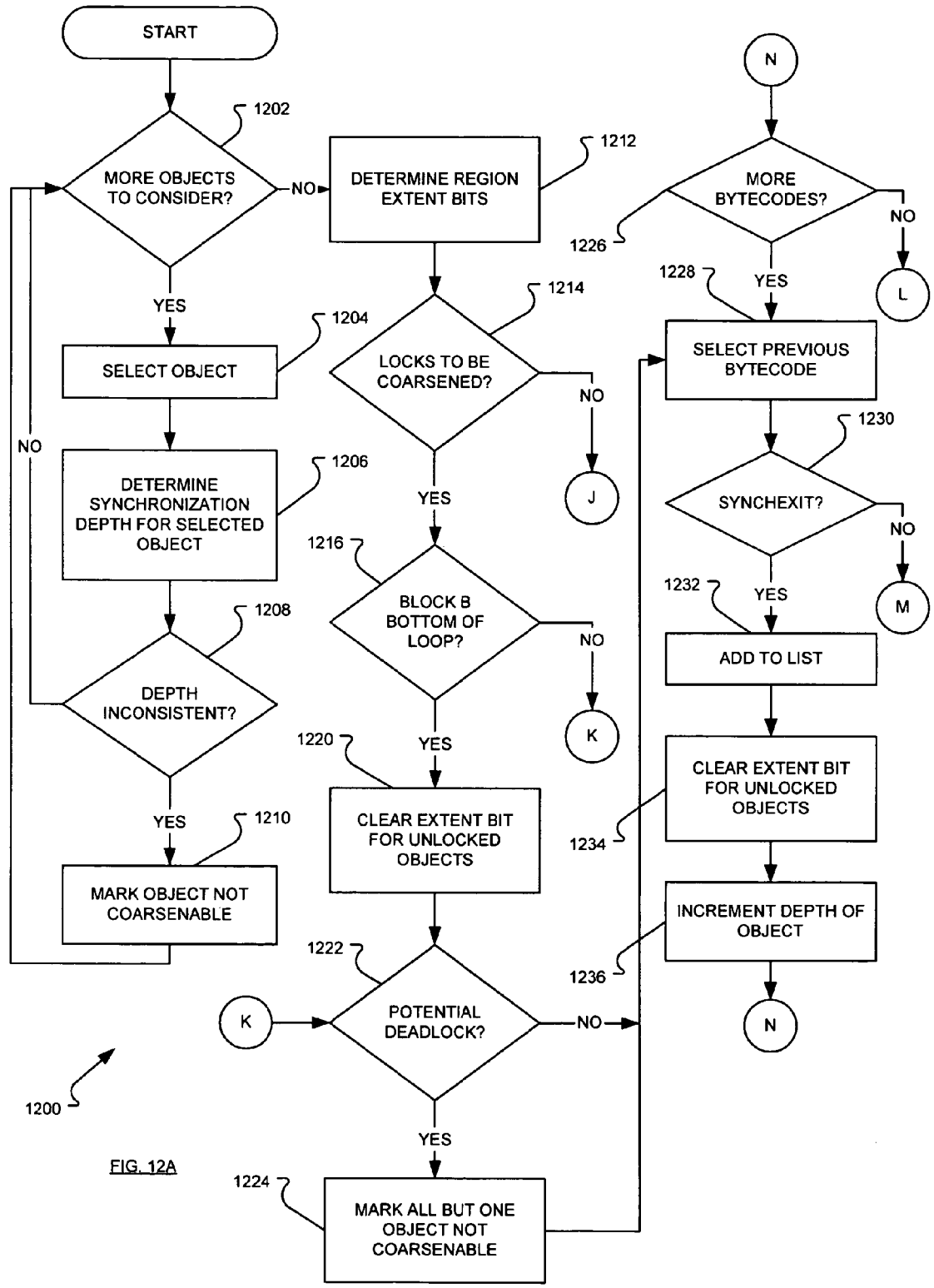
FIG. 12A illustrates an expansion of the steps in the second step of the method of FIG. 6 according to an embodiment of the present invention.
Figure 12B:
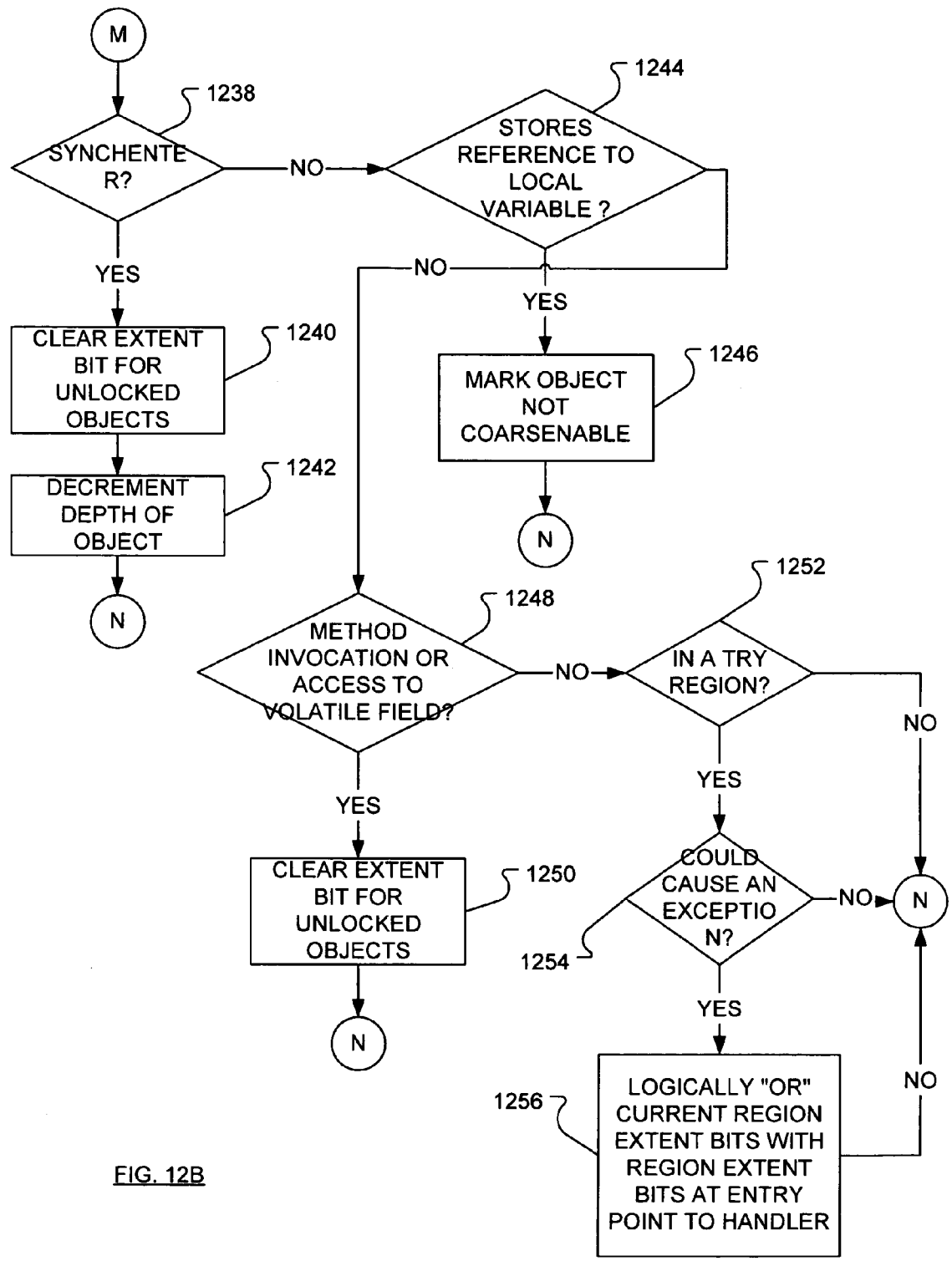
FIG. 12B illustrates a continuation of the steps of FIG. 12A according to an embodiment of the present invention.
Figure 12C:
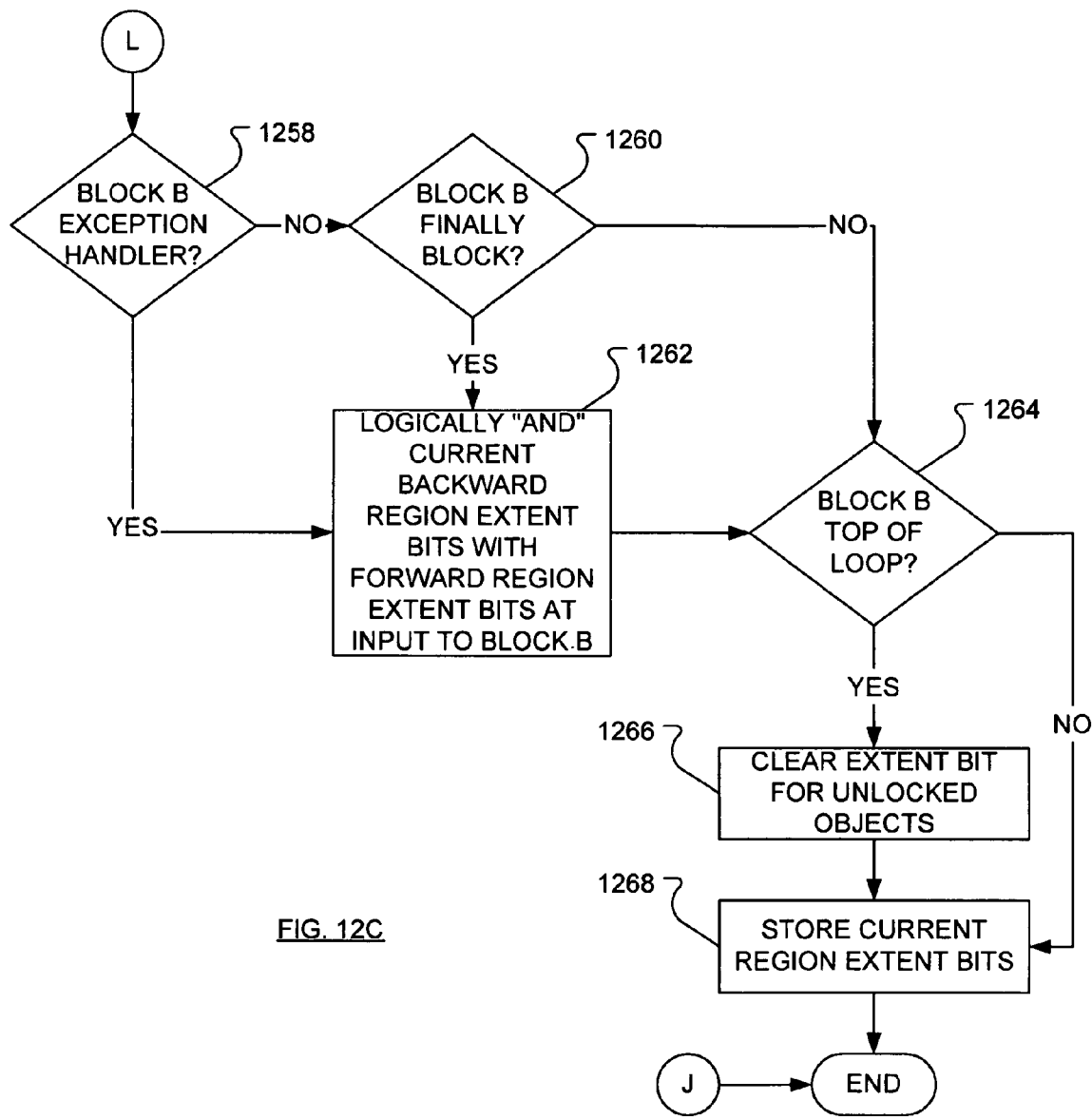
FIG. 12C illustrates a further continuation of the steps of FIG. 12A and FIG. 12B according to an embodiment of the present invention.

An outline of the high-level steps in the second (backward) pass over a given block B in a given method is presented in FIGS. 12A, 12B and 12C. Initially, each object that has been visited in a successor block of block B is individually considered. Beginning in FIG. 12A, an object to consider is selected (step 1204) and the synchronization depth for the selected block is then determined (step 1206) for the various successor blocks. If it is determined (step 1208) that the depths from different successor blocks are inconsistent for the selected object, the selected object is marked as "not coarsenable" (step 1210). Subsequently, it is determined whether there are further objects to consider (step 1202). Additionally, if it is determined (step 1208) that the depths from different successor blocks are consistent for the selected object, it is determined whether there are further objects to consider (step 1202).

Once all objects have been considered, the output backward region extent bits for block B are determined (step 1212) by logically ORing the input backward region extent bits of the successor blocks of block B. If block B is in a try block, the input backward region extent bits of the exception handler blocks associated with the try block are included in the logical OR operation. It is then determined whether there are any locks to be coarsened (step 1214). If there are locks to be coarsened, it is then determined (step 1216) whether block B is at the bottom of a loop by testing for unvisited successor blocks. If it is determined that block B is at the bottom of a loop, the backward region extent bits are cleared (step 1220) for unlocked objects. It is then determined whether there is a potential deadlock in block B (step 1222). That is, a subset of objects is determined whose backward region extent bit is set. If there is more than one object in the subset and an output forward region extent bit set for at least two of the objects in the subset, all but one of the objects in the subset are marked as not coarsenable (step 1224). The object that is not so marked is the object with the greatest number of lock operations for the entire method, as determined in the first (forward) pass.

The bytecodes of block B are then considered in reverse order. Initially, the last bytecode is considered and then each previous bytecode is selected for consideration. When a previous bytecode is selected (step 1228), it is determined (step 1230) whether the selected bytecode is a syncexit. If the selected bytecode is determined to be a syncexit, the syncexit operation is added to a list of coarsenable locking operations (step 1232). At the point of the syncexit operation, the backward region extent bit is cleared (step 1234) for all unlocked objects and the depth of the object unlocked by the syncexit is incremented (step 1236). It is then determined (step 1226) whether there are more bytecodes to consider.

If it is determined (step 1230, FIG. 12A) that the selected bytecode is not a syncexit, it is determined (step 1238, FIG. 12B) whether the selected bytecode is a syncenter. If it is determined (step 1238) that the selected bytecode is a syncenter, the backward region extent bit for all currently unlocked objects is cleared (step 1240) and the depth of the object unlocked by the syncexit is decremented (step 1242). It is then determined (step 1226, FIG. 12A) whether there are more bytecodes to consider.

If it is determined (step 1238) that the selected bytecode is not a syncenter, the selected bytecode is examined to see if locked regions can be extended. For instance, it is determined (step 1244) whether the selected bytecode stores a reference to a local variable used by a lock operation in the given method. If it is determined that the selected bytecode performs such a store, the object is marked (step 1246) as not coarsenable, unless all such lock operations are dominated by the selected bytecode. It is then determined (step 1226) whether there are more bytecodes to consider.

Additionally, if it is determined (step 1248) that the selected bytecode is a method invocation or accesses a volatile field, the backward region extent bits are cleared (step 1250) for unlocked objects. It is then determined (step 1226) whether there are more bytecodes to consider.

Furthermore, if it is determined (step 1252) that the selected bytecode is in a try region and, further, it is determined (step 1254) that the selected bytecode could cause an exception, then the current backward region extent bits are logically ORed with the entry point backward region extent bits at the handler for each exception. It is then determined (step 1226) whether there are more bytecodes to consider. It is also determined (step 1226) whether there are more bytecodes to consider where the selected bytecode is not in a try region, or where the selected bytecode could not cause an exception.

If it is determined (step 1226, FIG. 12A) that there are no more bytecodes to consider, it is then determined (step 1258, FIG. 12C) whether block B is an exception handler block. If it is determined that block B is not an exception handler block, it is determined (step 1260) whether block B is a finally entry block. If it is determined that block B is an exception handler block or finally entry block, the current backward extent bits are logically ANDed with the forward region extent bits at the input of block B (step 1262). Subsequently, or if it is determined that block B is not a finally entry block, it is determined (step 1264) whether block B is at the top of a loop by testing for a predecessor block that dominates block B. If it is determined that block B is at the top of a loop, the backward region extent bits are cleared (step 1266) for unlocked objects. Subsequently, and where block B is determined not to be at the bottom of a loop, the current backward region extent bits are stored as the input backward region extent bits for block B. The second pass over block B is then considered complete.

In the transformation step (step 606) of the first implementation, the forward region extent bits are logically ANDed with the backward region extent bits at the input and output of each basic block to result in a set of "new extent bits". The extent of to-be-coarsened regions may then be determined for each object. A given object is locked within a block whose corresponding new extent bit is set at the output but not at the input. A given object is locked for the entire block whose corresponding new extent bit is set at the input and output. A given object is unlocked within a block whose corresponding new extent bit is set at the input but not at the output.

Every normal control flow edge is then examined to identify flow edges entering the to-be-coarsened regions from a block wherein the object is not explicitly locked. Every normal control flow edge is also examined to identify flow edges leaving the to-be-coarsened regions where the object is not explicitly unlocked. Along all such flow edges, new syncenter operations and syncexit operations are inserted so that each object is locked precisely inside the coarsened region and unlocked outside that region.

It is also during this transformation step that the syncenter operations and syncexit operations placed on the list of coarsenable operations by the first pass and the second pass, respectively, are potentially removed from the method. As each operation on the list is examined, the object on which the operation operates is checked to determine whether the operation can be legally coarsened. If the operation can be legally coarsened, it is considered safe to remove the operation. Otherwise, the operation is left in place.

In this context, removing syncenter operations and syncexit operations only refers to the locking and unlocking aspects of these instructions. Any memory coherence actions dictated by the Java Memory Model are still performed (see Tim Lindholm, Frank Yellin, "The Java™ Virtual Machine Specification, Second Edition", http://java.sun.com/docs/books/vmspec/2nd-edition/html/VMSpecTOC.doc.html, which is hereby incorporated herein by reference).

Steps in a lock coarsening method 600 according to the first implementation are illustrated in FIG. 6 and may be considered in conjunction with FIGS. 1A, 1B and 2. In FIG. 1A, the input forward region extent bits determined in the first pass (step 602) over the code represented by the exemplary control flow graph 100 are shown at the upper left of each basic block. Additionally, the output forward region extent bits determined in the first pass (step 602) over the code are shown at the lower left of each basic block. Note that, because object 0 can be extended along all of the exceptional flow edges from the try block 104 to the exception handler block 105, a locked region for the object can be extended to the exception handler block 105. It is recognized that object 0 can be extended along all of the exceptional flow edges (connections from the try block 104 to the exception handler block 105) because the input forward region extent bit for object 0 is set (=1) at the entry point to the exception handler block 105. All of the L (syncenter) operations except for the topmost one (in block 101) are placed in a list of coarsenable operations.

In FIG. 1A, the input backward region extent bits determined in the second pass (step 604) over the code represented by the exemplary control flow graph 100 are shown at the upper right of each basic block. Additionally, the output backward region extent bits determined in the second pass (step 604) over the code are shown at the lower right of each basic block. A locked region may be allowed to extend backwards along the exceptional flow edges (the connections between the try block 104 and the exception handler block 105) only because the forward extent bit is set at the input to the exception handler block 105. All of the U (syncexit) operations except for the lowermost one (in block 107) are placed on the list of coarsenable operations.

In FIG. 1B, the input new extent bits are shown at the upper right of each basic block. Additionally, the output new extent bits are shown at the lower right of each basic block. The input new extent bits are determined by logically ANDing the input forward region extent bits and the input backward region extent bits for each basic block. Similarly, the output new extent bits are determined by logically ANDing the output forward region extent bits and the output backward region extent bits for each basic block. All of the L and U operations on the coarsenable operation list are examined and then removed from the code. All flow edges but the flow edge between block 106 and block 108 are consistent in that they have the same new extent bit on both ends of the flow edge. For the flow edge between block 106 and block 108, the source block (block 106) is in the to-be-coarsened region but the target block (block 108) is not, indicating that an unlock operation is required along this flow edge. As illustrated in FIG. 2, a new block 210 is created containing a U (syncexit) operation and the new block 210 is inserted along the flow edge between block 106 and block 108, resulting in the coarsened synchronization shown in FIG. 2.

Note that synchronization operations (syncenter operations and syncexit operations) may only be inserted along flow edges with inconsistent extent bits if the object on which the synchronization operation operates is well defined at the program locations at which the synchronization operation is being inserted. As will be understood by a person skilled in the art, if an object reference used to lock the object is null, then the coarsened method could throw a NullPointerException that the original program would not have thrown.

In the first implementation, at the beginning of each basic block during the forward pass, it is determined whether previous nullness analysis (a standard Java JIT optimization that determines the program locations where an object reference might be null) has identified that an object reference associated with one of the locked objects might be null in the block. If it is so determined, then the forward region extent bit for that object is cleared. Similarly, in the backward pass at the beginning of the block, if an object might be null, then the backward region extent bit for the object is cleared. In this way, coarsening will not extend into a program region where the object might not be defined.

Figure 13:
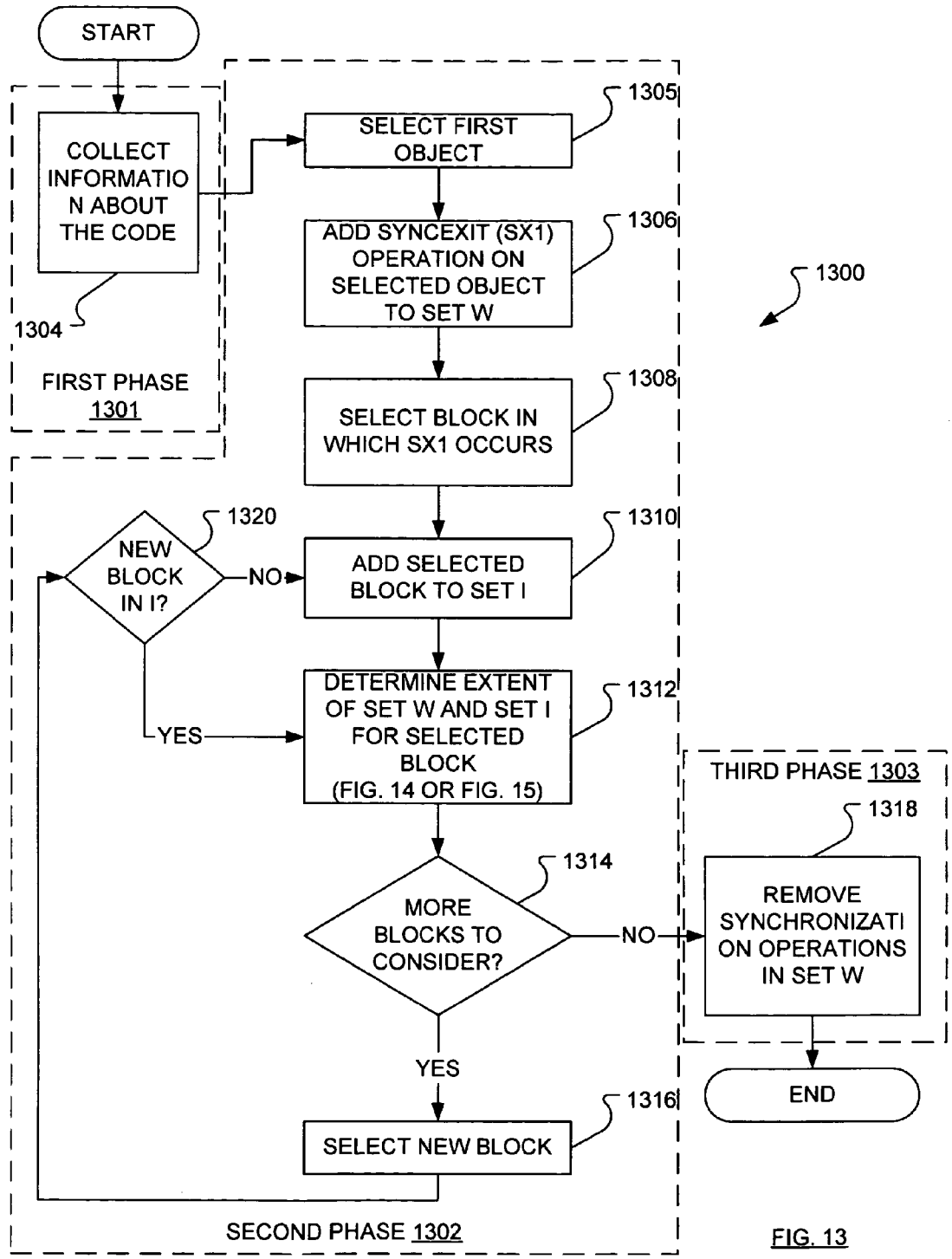
FIG. 13 illustrates the steps of a second lock coarsening method according to an embodiment of the present invention.

Steps in a lock coarsening method 1300 according to the second implementation are illustrated in FIG. 13. The second lock coarsening implementation includes three phases. In a first phase 1301, the code for which lock coarsening is to be performed is passed over to collect information about the code (step 1304). The information about the code collected in the first phase 1301 is then analyzed in a second phase 1302 and, in a third phase 1303, the code is transformed based on the analysis of the second phase 1302.

In particular, the first phase 1301 (step 1304) involves traversing the control flow graph of a method on which lock coarsening is to be performed. During such a traverse, each basic block, and each bytecode contained within each basic block, is considered. Such consideration involves collecting information about the location of lock operations, unlock operations, calls, exception checks and virtual guards. For each basic block, the set of reachable successor blocks and predecessor blocks is also determined.

In the second phase 1302 of the algorithm, for each lock operation, a set of unlock operations on the same object are identified. Also in the second phase of the algorithm, for each unlock operation, a set of lock operations on the same object are identified. Subsequently, the blocks intervening the lock operations and unlock operations are examined to determine whether the intervening blocks contain code that may prevent coarsening. In the third phase, a transformation step (step 1318) then alters the code, if coarsening can be performed.

As a precursor to the second lock coarsening implementation, it is expected that two standard compiler operations have been performed on the method code, namely a structural analysis operation and a value numbering operation. The structural analysis involves discovering the high level control flow structure in the method and, in particular, identifying loops within the method. In the output of the structural analysis operation, the structure of the method is represented using a recursive data structure that captures relationships of container structures and contained structures through parent links and child links (in the data structure) respectively. Thus, a nested loop may be represented as an outer natural loop structure that contains the inner natural loop structure as one of the sub-structures of the outer natural loop structure. Basic blocks are the simplest kinds of structures and do not have any sub-structures.

As will be apparent to a person skilled in the art, a "natural" loop structure is a program construct that satisfies two properties: a) the loop structure has a unique entry point (basic block) that dominates every other basic block in the loop (The loop cannot be entered from any other basic block other than this unique entry block) and b) there exists at least one back edge in every natural loop.

The value numbering operation involves assigning a unique value number to all expressions in the method that are definitely known to have the same value. The analysis is based on use-def information collected by doing reaching definitions analysis.

As will be appreciated by a person skilled in the art, a reaching definitions analysis, a standard compiler pass that associates uses and definitions of variables in a method, creates use-def information.

For example, in the following code fragment:
y=1;
x=2;
if (condition)
x=5;
else
x=3;
b=x+y;

There are three definitions of the "x" variable (x=2, x=5, and x=3), one definition of the "y" variable (y=1) and one use each of the x and y variables. Reaching definitions analysis determines which definitions of a variable are related to which uses of the variable. In this case, it is determined that the x=5 and x=3 definitions of x reach the use of x at b=x+y. It is further determined that the definition x=2 does not reach the use of x at b=x+y because x is redefined on all paths between that definition and the use at b=x+y. The analysis also determined that the definition y=1 reaches the use of y at b=x+y.

Use-def information is one of many representations of the result of reaching definitions analysis. Use-def information stores at each use of a variable as a "chain" (a list) of the definitions that reach that use. So, for the x operand of the b=x+y statement, the use-def information would include a chain describing the locations of the definitions x=5 and x=3. For the y operand of that same statement, the use-def information would include a chain describing the location of the single definition y=1. An alternative arrangement is def-use information where a chain of uses is stored at each definition point (so, at x=5 and at x=3 there would be chains referencing the location of the b=x+y statement). However, this alternative arrangement of information is not needed for lock coarsening.

In the first phase 1301 of the second lock coarsening implementation, the bytecodes are examined to collect information about which value numbers (objects) are locked multiply in the method. Note that coarsening need not be performed if no objects are locked more than once. Simultaneously, information is collected about which basic blocks contain:

inline-guarded virtual calls—virtual calls that are executed if an inline guard test fails;

unguarded virtual calls—virtual calls that are not guarded by an inline guard test;

exception causing code—code for which certain security checks are mandated by the Java virtual machine specification;

lock/unlock operations; and loop back edges—control flow graph edges from a basic block inside a loop to the loop header (garbage collection (GC) yield points are inserted by the virtual machine (VM) at every loop back edge);

In addition, information is collected about the first, if any, value number (object) locked in each basic block and which, if any, object is the last object to be unlocked at the end of each block. Where unlock/lock pairs on the same object are present within the same basic block, the pairs are eliminated.

The high-level program structure identified by the structural analysis is used in a block finding operation that determines which blocks within loops are at the same loop nesting depth and contained inside the same loop (if inside a loop). The implementation of this block finding operation is simply based on locating the natural loop at the innermost nesting depth that contains a basic block. For every basic block, there is always a unique such loop that can be identified, unless the basic block is not contained inside any loop.

In the first phase 1301 of the second lock coarsening implementation, the control flow graph is examined to, for each basic block, determine all the reachable predecessor blocks and successor blocks, ignoring loop back edges. Note that predecessor blocks and successor blocks are determined in a recursive manner.

The results of the structural analysis are used to identify loops and back edges. Since we are ignoring back edges while determining predecessor blocks and successor blocks, there is no iteration over the control flow graph of interest. All the required information is collected by considering every control flow edge exactly once. Additionally, back edges may be ignored in the first phase 1301 because a syncenter operation that is reached by a syncexit operation only through a back edge of a loop will not be coarsened, as such coarsening may result in synchronization being removed altogether inside the loop. Thus, it is considered that there is no value in determining successor blocks (or predecessor blocks) that are reached as a result of traversing a back edge.

Every syncenter operation and syncexit operation on a multiply locked object is considered to be a candidate for coarsening. The set of related syncenter operations and syncexit operations between a first syncenter operation and a last syncexit operation is determined and each of the members of this set may be coarsened simultaneously. The coarsening is performed using the algorithm illustrated in FIG. 13.

SN may be used to denote the set of basic blocks that contain syncenter operations. Similarly, SX may be used to denote the set of basic blocks that contain syncexit operations.

In the following, many operations are performed on sets of blocks. It is considered that implementation of these set operations may be performed by a digital computer where the sets are represented by bit vectors. Such bit vectors each have as many elements as there are blocks in the control flow graph representation of the code. The presence of the n'th block in a particular set may be represented by the n'th bit in the bit vector being set (=1). The equivalent logic operations to set operations may be made where necessary, e.g., the intersection of two sets may be performed by a logical AND between the bit vector representations of the sets.

Initially, a first object is selected (step 1305) that is known to be locked multiple times. As described hereinbefore, the selected object is associated with a value number VN1. A syncexit operation SX1, in a basic block B1, that unlocks the selected object is added (step 1306) to a working set W of synchronization operations (syncenter operations or syncexit operations) that can later be coarsened (i.e., removed). The earliest basic block B1 in which SX1 occurs is selected (step 1308) and then added (step 1310) to a working intersection set I of basic blocks across which the object having value number VN1 is locked as a result of performing lock coarsening. The extent of working set W and intersection set I is then determined (step 1312) given input comprising the basic block B1 containing the syncexit operation SX1 on an object having a value number VN1. Note that, in the determining the extent of working set W and intersection set I (step 1312), different steps are performed if the input comprises a basic block containing a syncenter operation (more detail is provided hereinafter).

Once the extent of working set W and intersection set I has been determined based on basic block B1, it is determined whether other blocks in the control flow graph are to be considered (step 1314). If so, a new block is selected (step 1316). It is then determined whether the newly selected block is in intersection set I (step 1320). If not, the newly selected block is added to intersection set I (step 1310). Subsequently, or if newly selected block is in intersection set I, and the extent of working set W and intersection set I is determined based on the newly selected block (step 1312). If no other blocks are to be considered, the third phase 1303 of the algorithm is performed, wherein the code that is under consideration is transformed, or modified, based on working set W and intersection set I. In particular, the synchronization operation in working set W are removed from the code (step 1318) resulting in a synchronization region that includes all of the blocks in intersection set I.

Figure 14:
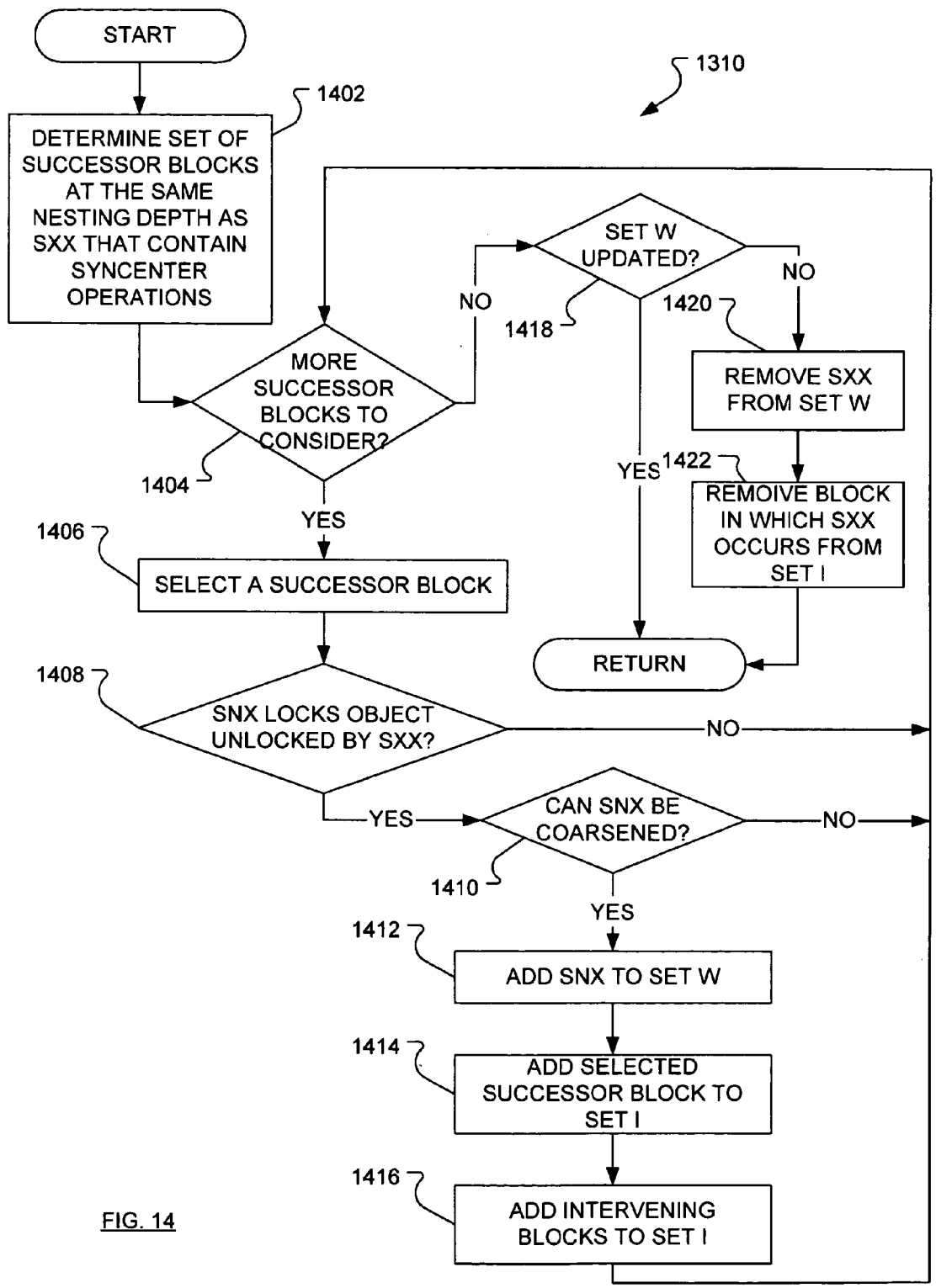
FIG. 14 illustrates steps in an expansion of one of the steps of FIG. 13 in a first case.

In consideration of a situation wherein basic block B1 contains a generic syncexit operation SXX, the set extent determination step (step 1312) may be accomplished using the steps illustrated in FIG. 14. The notation Succ(B1) may be used to denote a set of the successor blocks of block B1. Additionally, the notation SNSucc(B1) may be used to denote a set of the successor blocks of B1 that contain syncenter operations. SNSucc(B1) and may be determined as:

SNSucc(B1)=Succ(B1) n SN.

This intersection operation has the effect of obtaining an initial set of basic blocks that are of interest from a coarsening point of view for a syncexit operation. Note that, at this stage, the actual object being locked in each of the blocks in the set SNSucc(B1) has not yet been considered.

SNSucc(B1) can be refined to contain only candidates at the same loop nesting depth by determining the following set:
SNSucc(B1)=SNSucc(B1) n BlocksAtSameLoopNestingLevel(B1)

Note that BlocksAtSameLoopNestingLevel(B1) is part of the information gathered in the first phase 1301. This step (step 1402) narrows down the possible candidates with which lock coarsening can be attempted for a syncexit operation in block B1. At a high level, coarsening is constrained to be performed only on synchronization operations at the same loop nesting depth.

A successor block that is an element of SNSucc(B1) is then selected (step 1406). It is then determined whether the first syncenter operation in the selected successor block locks an object having the same value number as the supplied syncexit operation (step 1408). If so, then it is determined whether the syncenter operation may be coarsened (step 1410). That is, a set of blocks that intervene block B1 and the selected successor block, Intervening(B1, S), is determined, where
Intervening(B1, S)=Succ(B1) n Pred(S).

It is determined that the syncenter operation may be coarsened as long as none of the blocks in Intervening(B1, S) contain any unguarded calls, syncenter operations, syncexit operations or GC yield points. If it is determined that the syncenter operation may be coarsened, the syncenter operation is added to working set W (step 1412) and the selected successor block is added to intersection set I (step 1414). Additionally, all basic blocks in Intervening(B1, S) are added to intersection set I (step 1416).

If it is determined (step 1410) that the syncenter operation may not be coarsened, or it is determined (step 1408) that the first syncenter operation in the selected block does not lock an object with the same value number as the supplied syncexit operation, it is determined whether there are further elements of SNSucc(B1) (successor blocks) to consider (step 1404). If there are further successor blocks to consider, a successor block is again selected (step 1406) for consideration. However, there are no further successor blocks to consider, it is determined whether coarsening over any block may be performed (step 1418), i.e., whether working set W has been updated by the execution of step 1312. If it is determined that coarsening cannot be performed over any considered block, syncexit operation SXX is removed from working set W (step 1420) and block B1 is removed from intersection set I (step 1422). Set extent determination (step 1312) is then considered to be complete. Alternatively, where synchronization operations have been added to working set W, set extent determination (step 1312) is considered to be complete.

In review, the set extent determination step is where the process of matching synchronization operations is performed. Coarsening can only be done among synchronization operations on the same object (the object with the same value number) and this step identifies those successor blocks that are relevant for a given value number. By ensuring that there no unguarded calls, syncenter operations, syncexit operations or GC yield points in any of the blocks that intervene the two (to be coarsened) synchronization operations, we ensure that we do not violate constraints mentioned hereinbefore. Coarsening across unguarded calls or synchronization operations on other objects would violate adherence to the Java memory model, whereas coarsening across GC points (back edges) would violate the maintenance of program correctness. Once it is determined that coarsening may be performed successfully (step 1410), the syncenter operation may be added (step 1412) to working set W of synchronization operations that can be simultaneously eliminated.

By adding intervening basic blocks to intersection set I (step 1416), a record of the blocks across which a lock will be held after coarsening may be maintained. This maintenance is useful for two purposes. Firstly, coarsening more than once across the same block may be avoided when such information is available. Secondly, some adjustment code may be required at entry points to blocks in intersection set I and at exit points from blocks in intersection set I (to be discussed in detail hereinafter).

Figure 15:
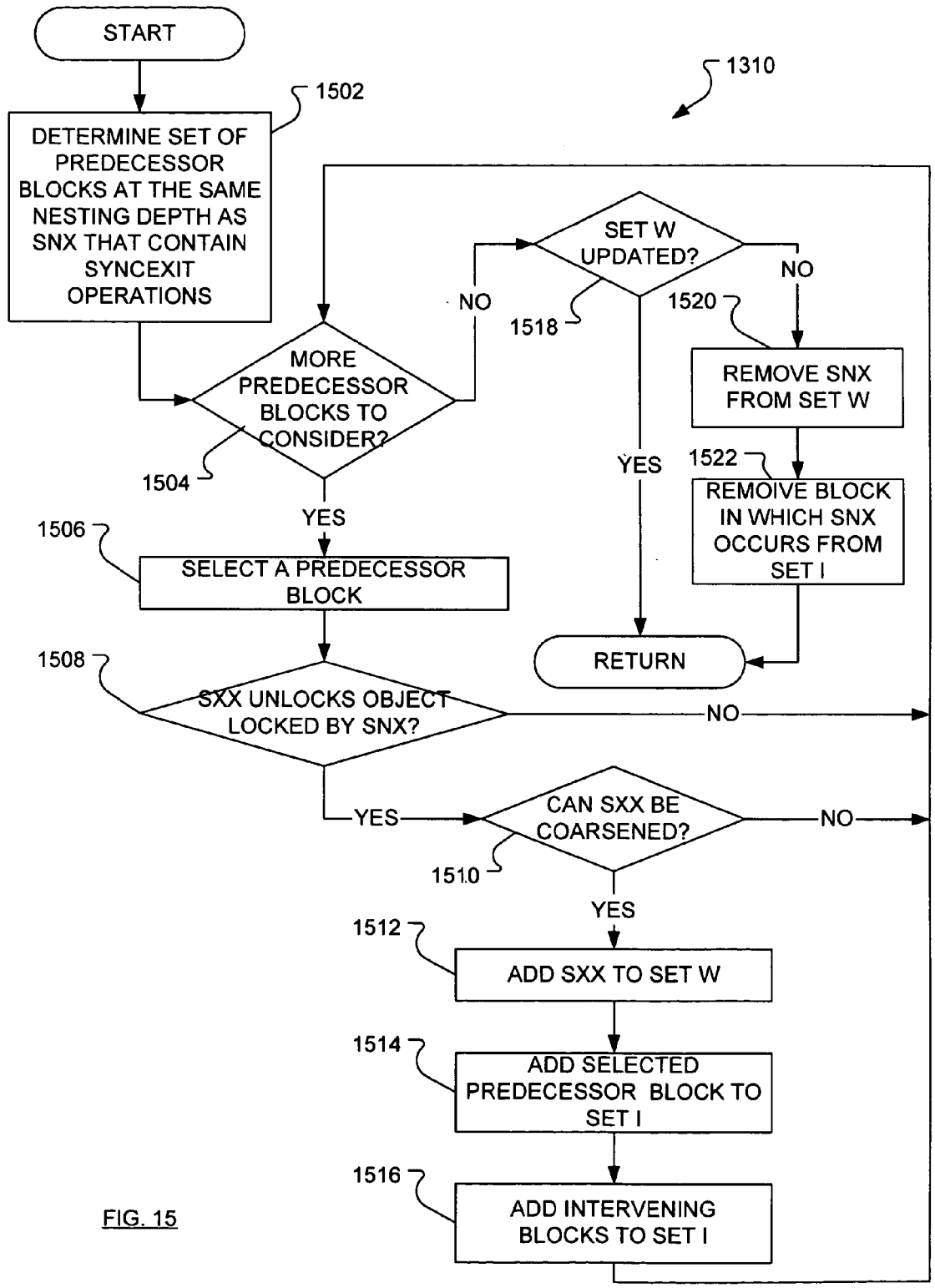
FIG. 15 illustrates steps in an expansion of one of the steps of FIG. 13 in a second case.

In consideration of a situation wherein basic block B1 contains a generic syncenter operation SNX, the set extent determination step (step 1312) may be accomplished using the steps illustrated in FIG. 15. The notation Pred(B1) may be used to denote a set of the predecessor blocks of block B1. Additionally, SXPred(B1) may be used to denote a set of the predecessor blocks of B1 that contain syncexit operations. SXPred(B1) and may be determined as:
SXPred(B1)=Pred(B1) n SX.

SXPred(B1) can be refined to contain only candidates at the same loop nesting depth by determining the following set:
SXPred(B1)=SXPred(B1) n BlocksAtSameLoopNestingLevel(B1).

A predecessor block that is an element of SXPred(B1) is then selected (step 1506). It is then determined whether the last syncexit operation in the selected predecessor block unlocks an object having the same value number as the supplied syncenter operation (step 1508). If so, then it is determined whether the syncexit operation may be coarsened (step 1510). That is, a set of blocks that intervene block B1 and the selected predecessor block, Intervening(B1, S), is determined, where
Intervening(P, B1)=Succ(P) n Pred(B1).

It is determined that the syncexit operation may be coarsened as long as none of the blocks in Intervening(P, B1) contain any unguarded calls, syncenter operations, syncexit operations or GC yield points. If it is determined that the syncexit operation may be coarsened, the syncexit operation is added to working set W (step 1512) and the selected predecessor block is added to intersection set I (step 1514). Additionally, all basic blocks in Intervening(P, B1) are added to intersection set I (step 1516).

If it is determined (step 1510) that the syncexit operation may not be coarsened, or it is determined (step 1508) that the last syncexit operation in the selected block does not unlock an object with the same value number as the supplied syncenter operation, it is determined whether there are further elements of SXPred(B1) (predecessor blocks) to consider (step 1504). If there are further predecessor blocks to consider, a predecessor block is again selected (step 1506) for consideration. However, there are no further predecessor blocks to consider, it is determined whether coarsening over any block may be performed (step 1518), i.e., whether working set W has been updated by the execution of step 1312. If it is determined that coarsening cannot be performed over any considered block, syncenter operation SNX is removed from working set W (step 1520) and block B1 is removed from intersection set I (step 1522). Set extent determination (step 1312) is then considered to be complete. Alternatively, where synchronization operations have been added to working set W, set extent determination (step 1312) is considered to be complete.

In steps 1414,1416,151 and 1516, new blocks may be added to intersection set I. Such newly added blocks may be designated to be the first blocks selected (step 1316, FIG. 13) for recursions of the above steps.

In step 1318 of the third phase 1303 of the algorithm 1300 of FIG. 3, all the synchronization operations in working set W can be eliminated simultaneously. Note that since the Succ and Pred sets for basic blocks are intersected with basic blocks at the same nesting depth at each stage, coarsening does not occur between blocks that are at different loop nesting depth. The above procedure is repeated by selecting (in step 1316) blocks that contain any remaining syncexit operations on multiply locked objects not already analyzed, before the lock coarsening operation is considered to be complete.

Figure 16:
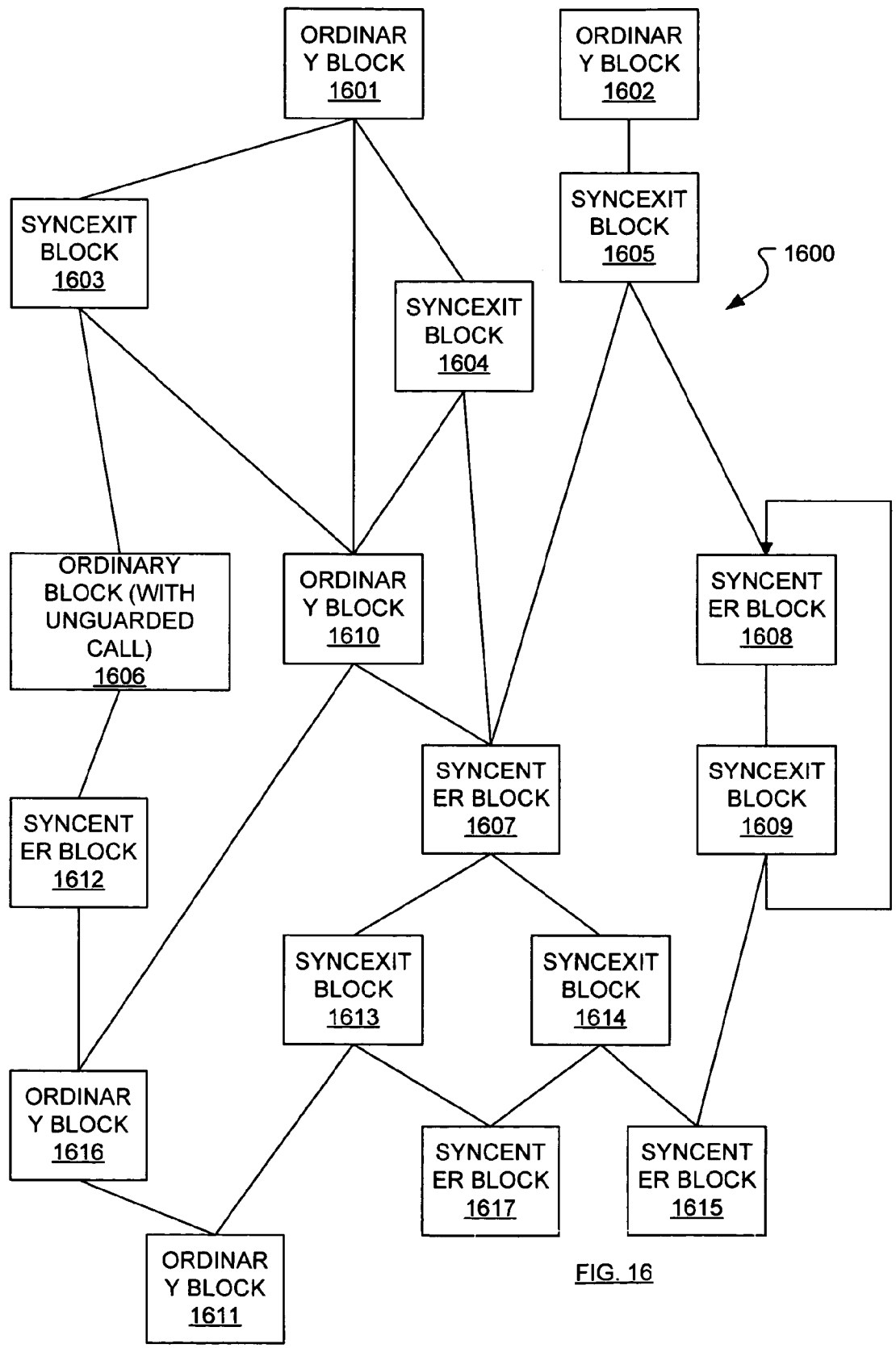
FIG. 16 illustrates an exemplary control flow graph before lock coarsening.

FIG. 16 illustrates an exemplary control flow graph 1600 including a number of basic blocks identified as 1601, 1602, 1603, 1604, 1605, 1606, 1607, 1608, 1609, 1610, 1611, 1612, 1613, 1614, 1615, 1616 and 1617. According to the first phase 1301 of the second implementation, information collection may include the identifying of the predecessor blocks for each of the basic blocks of the exemplary control flow graph 1600.

In the following, the notation Pred(x)={y, z}) indicates that the set of predecessor blocks of block x includes blocks y and z.

Pred(1601)={ }
Pred(1602)={ }
Pred(1603)={1601}
Pred(1604)={1601}
Pred(1605)={1602}
Pred(1606)={1601, 1603}
Pred(1607)={1601, 1602, 1603, 1604, 1605, 1610}
Pred(1608)={1602, 1605}
Pred(1609)={1602, 1605, 1608}
Pred(1610)={1601, 1603, 1604}
Pred(1611)={1601, 1602, 1603, 1604, 1605, 1606, 1607, 1610, 1612, 1613}
Pred(1612)={1601, 1603, 1606}
Pred(1613)={1601, 1602, 1603, 1604, 1605, 1607, 1610}
Pred(1614)={1601, 1602, 1603, 1604, 1605, 1607, 1610}
Pred(1615)={1601, 1602, 1603, 1604, 1605, 1607, 1608, 1609, 1610, 1614}
Pred(1616)={1601, 1602, 1603, 1604, 1605, 1606, 1610, 1612}
Pred(1617)={1601, 1602, 1603, 1604, 1605, 1607, 1608, 1609, 1610, 1613, 1614}

Additionally, information collection may include the identifying of the successor blocks for each of the basic blocks of the exemplary control flow graph 1600.

In the following, the notation Succ(x)={y, z} indicates that the set of successor blocks of block x includes blocks y and z.

Succ(1601)32 {1603, 1604, 1606, 1607, 1610, 1611, 1612, 1613, 1614, 1615, 1616, 1617}
Succ(1602)={1605, 1607, 1608, 1609, 1611, 1613, 1614, 1615, 1617}
Succ(1603)={1606, 1607, 1610, 1611, 1612, 1613, 1614, 1615, 1616, 1617}
Succ(1604)={1607, 1610, 1611, 1613, 1614, 1615, 1616, 1617}
Succ(1605)={1607, 1608, 1609, 1611, 1613, 1614, 1615, 1617}
Succ(1606)={1611, 1612, 1616}
Succ(1607)={1611, 1613, 1614, 1615, 1617}
Succ(1608)={1609, 1615}
Succ(1609)={1615}
Succ(1610)={1607, 1611, 1613, 1614, 1615, 1616, 1617}
Succ(1611)={ }
Succ(1612)={1611, 1616}
Succ(1613)={1611, 1617}
Succ(1614)={1615, 1617}
Succ(1615)={ }
Succ(1616)={1611}
Succ(1617)={ }

The first phase 1301 may include a block finding operation that determines which blocks within loops are at the same loop nesting depth and contained inside the same loop. The output of the block finding operation for the exemplary control flow graph 1600 of FIG. 16 would be:

Blocks at nesting level 0={1601, 1602, 1603, 1604, 1605, 1606, 1607, 1610, 1611, 1612, 1613, 1614, 1615, 1616, 1617}

Blocks at nesting level 1={1608, 1609}

The first phase 1301 also includes the collection of information about which basic blocks contain various predetermined bytecodes. The output of such a collection for the exemplary control flow graph 1600 of FIG. 16 would be:

Blocks containing unguarded calls={1606}

Blocks containing syncenter operations={1607, 1608, 1612, 1615, 1617}

Blocks containing syncexit operations={1603, 1604, 1605, 1609, 1613, 1614}

In the control flow graph 1600 shown in FIG. 16, it may be assumed that all the synchronization operations referenced are on an object having one particular value number and that SNN and SXN are a syncenter operation and a syncexit operation, respectively, on block N.

Initially, block 1603 is added to intersection set I (step 1306) and syncexit operation SX3 in block 1603 is added to working set W (step 1310). It may then be determined (step 1402) that SNSucc(1603)={1607, 1612}, that is, block 1607 and block 1612 are successor blocks of block 1603 that are at same nesting depth as block 1603 and contain syncenter operations on an object with same value number as the object on which SX3 operates.

Block 1612 may be selected (step 1406) for consideration. It may then be determined that Intervening(1603, 1612)={1606} and subsequently determined (step 1410) that block 1606 contains an unguarded call, such that coarsening may not performed between block 1603 and block 1612.

Block 1607 may be selected (step 1406) for consideration. It may then be determined that Intervening(1603, 1607)={1610} and, since block 1610 does not contain any kill points (calls, etc.), such that coarsening may be performed between blocks 1603 and 1607. Consequently, syncenter operation SN7 is added (step 1412) to working set W and blocks 1607 and 1610 are added to intersection set I (steps 1414 and 1416) such that working set W={SX3, SN7} and intersection set I={1603, 1607, 1610}.

Following the recursive steps outlined in the algorithm presented above, eventually working set W={SX3, SN7, SX4, SX5} and the intersection set I={1603, 1607, 1610, 1604, 1605}. In arriving at this solution, basic blocks that contain kill points (that prevent coarsening) are recognized to include block 1613 and block 1614, which contain syncexit operations that are not yet eliminated, and block 1608 and block 1609 which are inside a potentially long-running loop. Note that the syncexit operations of block 1613 and block 1614 are not yet eliminated as the blocks have not been considered. Block 1613 and block 1614 have not been considered because neither block is a predecessor block of any block containing a syncenter operation that can be coarsened with syncexit operation SX3.

At the point at which no new blocks have been added to intersection set I, blocks containing remaining syncexit operations may be selected in step 1316. In particular, block 1613 may be selected leading to the addition of syncexit operation SX1 3 to working set W and block 1613 is to intersection set I such that working set W={SX3, SN7, SX4, SX5, SX13} and intersection set I={1603, 1607, 1610, 1604, 1605, 1613}. It may be determined that SNSucc(13)={1617} and that block 1617 is at the same nesting depth as block 1613. Since block 1617 is a direct successor of block 1613, it may be determined that coarsening can be performed between these two blocks.

Since block 1617 has been recently added to intersection set I, block 1617 is selected (step 1316) for consideration and syncenter operation SN17 is added to working set W such that working set W={SX3, SN7, SX4, SX5, SX13, SN17} and intersection set I={1603, 1607, 1610, 1604, 1605, 1613, 1617}.

Following the recursive steps outlined in the algorithm presented above, eventually working set W={SX3, SN7, SX4, SX5, SX13, SN17, SX14, SN15} and intersection set I={1603, 1607, 1610, 1604, 1605, 1613, 1617, 1614, 1615}.

Figure 17:
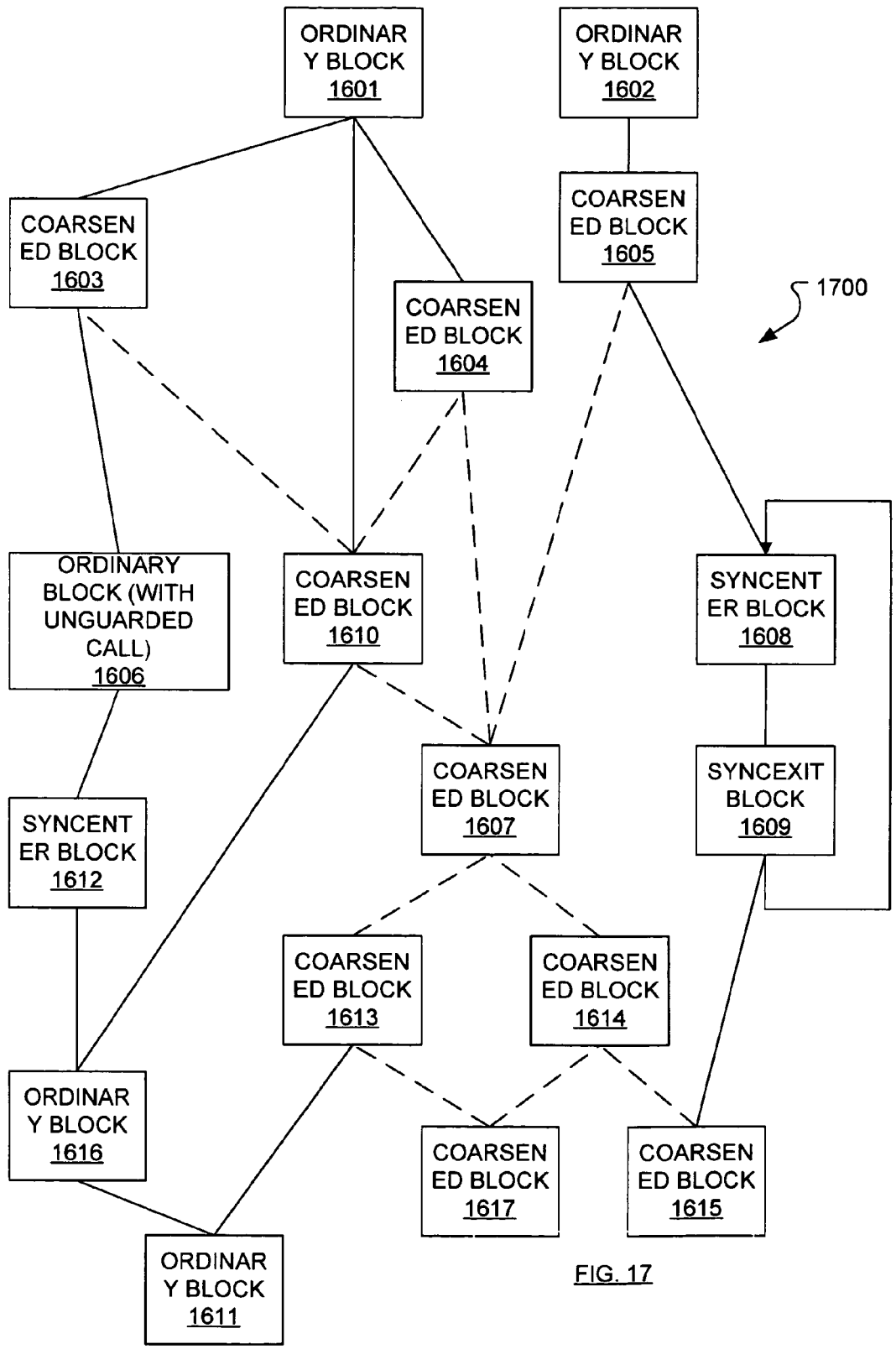
FIG. 17 illustrates the exemplary control flow graph of FIG. 16 after lock coarsening according to an embodiment of the present invention.

FIG. 17 illustrates a control flow graph 1700 representative of the control flow graph of FIG. 16 after the three phases of the second implementation of lock coarsening have been performed. Dashed lines indicate the flow edges that connect blocks in the coarsened region. In particular, the synchronization operations in working set W have been eliminated giving rise to a locking region that encompasses all of the blocks in intersection set I.

Figure 18:
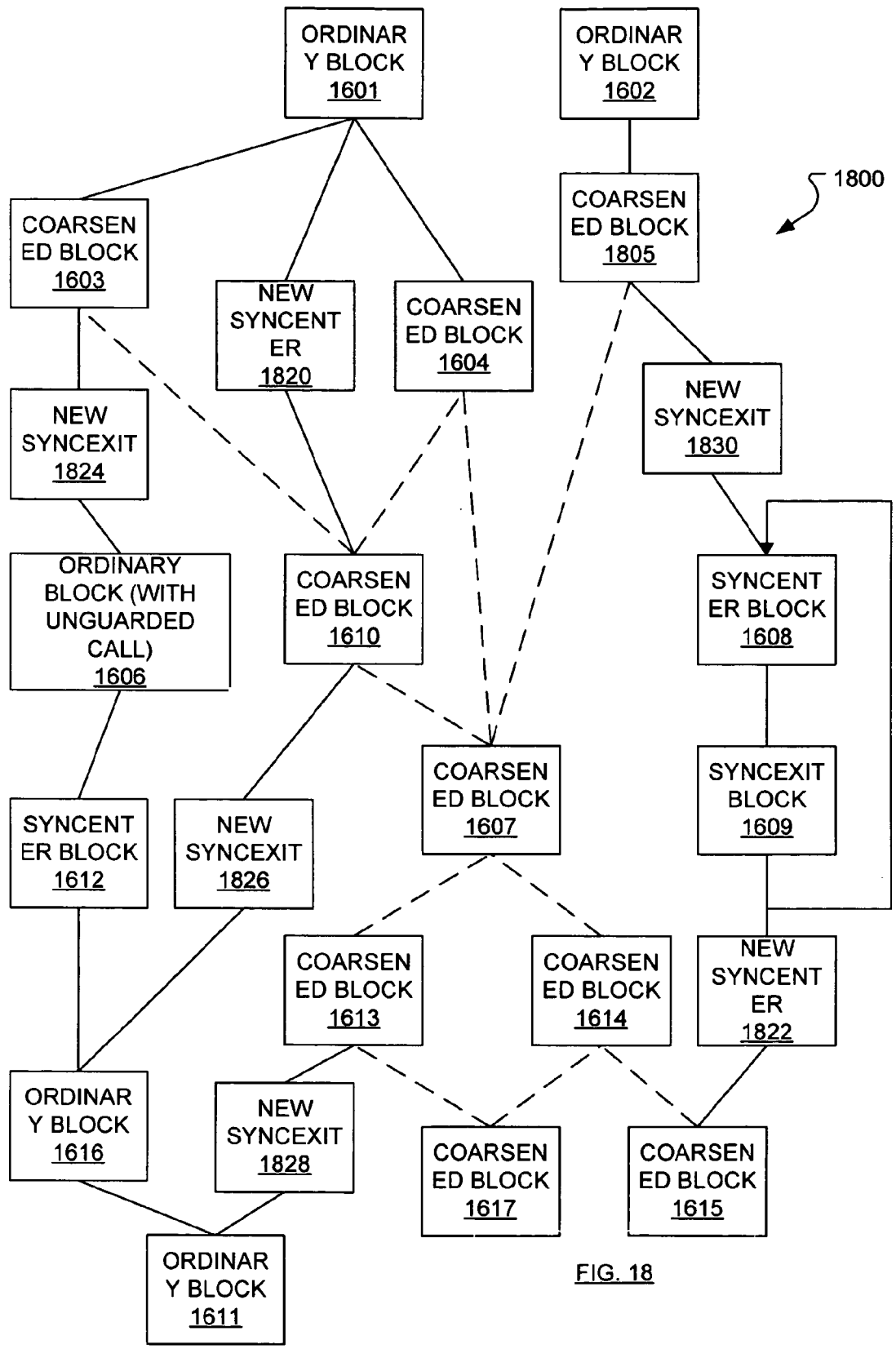
FIG. 18 illustrates the exemplary control flow graph of FIG. 17 after further consideration of the lock coarsening according to an embodiment of the present invention.

There may be some further adjustments that are required to ensure that the code after lock coarsening is semantically equivalent to the code before lock coarsening. FIG. 18 illustrates a control flow graph 1800 representative of the control flow graph 1700 of FIG. 17 after further adjustments have been performed.

Blocks in intersection set I represent a region of code across which the object is locked after coarsening, where the object was not locked in the original code. Note that it may be possible to enter a coarsened control flow region without passing through any of the blocks containing (coarsened) syncexit operations, and similarly to exit a coarsened region without passing through any of the blocks containing syncenter operations. Hence, if a basic block B is an element of intersection set I and basic block B has a predecessor or successor block C that is not an element of intersection set I, compensating code must be inserted, as described below.

If block B's predecessor block C is not an element of intersection set I and block B did not originally contain a syncexit operation, the flow edge from block C to block B may be split by inserting a new block containing a syncenter operation. The new block ensures that legal synchronization state is maintained if the control flow path through the flow edge from block C to block B is taken into coarsened region. In the example coarsened control flow graph 1700 illustrated in FIG. 17, block 1601 is a predecessor block to block 1610 and block 1601 is not an element of the intersection set I. Consequently, the edge from block 1601 to block 1610 may be split through the addition of a new syncenter block 1820 (FIG. 18). Additionally, block 1609 is a predecessor block to block 1615 and block 1609 is not an element of the intersection set I. Consequently, the edge from block 1609 to block 1615 may be split though the addition of a new syncenter block 1822 (FIG. 18).

If block B's successor block C is not an element of intersection set I and block B did not originally contain a syncexit operation, the flow edge from block B to block C may be split by inserting a new block containing a syncexit operation. The new block ensures that legal synchronized state is maintained if the control flow path through the flow edge from block B to block C is taken when exiting from the coarsened region. In the example coarsened control flow graph 1700 illustrated in FIG. 17, block 1606 is a successor block to block 1603 and block 1606 is not an element of the intersection set I. Consequently, the edge from block 1603 to block 1606 may be split through the addition of a new syncexit block 1824 (FIG. 18). Additionally, block 1616 is a successor block to block 1610 and block 1616 is not an element of the intersection set I. Consequently, the edge from block 1610 to block 1616 may be split through the addition of a new syncexit block 1826 (FIG. 18). Further, block 1611 is a successor block to block 1613 and block 1611 is not an element of the intersection set I. Consequently, the edge from block 1613 to block 1611 may be split through the addition of a new syncexit block 1828 (FIG. 18). Even further, block 1608 is a successor block to block 1605 and block 1608 is not an element of the intersection set I. Consequently, the edge from block 1605 to block 1608 may be split through the addition of a new syncexit block 1830 (FIG. 18).

Lock coarsening is allowed to occur even if some of the blocks in intersection set I contain virtual calls that are guarded by inline guards. Note that we must unlock the object before the call and lock it again after the call to preserve correct semantics of the original code. This could potentially defeat the purpose of performing coarsening, especially if the inline-guarded virtual call was actually a frequently executed path in the program. However, it has been observed in practice that inline guards rarely fail and, consequently, the virtual call is rarely executed. Thus, surrounding the virtual call by a pair of unlock/lock operations is unlikely to degrade performance.

Note that this is a conservative strategy because this is the only case in which synchronization operations are added. In some JIT compilers, the execution of a compilation of a method is monitored. Such monitoring may be used by a compiler to "profile" blocks in the control flow graph representation of the code. A profile of a given block may indicate the number of times the given block is executed. Such a profile may be used to determine whether or not the given block is on a commonly executed path. The profile may be used in a subsequent compilation. A "hot" control flow path (or basic block) is one that is executed commonly in comparison to the other basic blocks in the method. A "cold" control flow path (or basic block) is one that is executed rarely in comparison to the other blocks in the method. A more aggressive lock coarsening strategy could take into account block profiles and only insert unlock/lock pairs across calls that are on known cold control flow paths.

An even more aggressive strategy would involve allowing insertion of unlock/lock pairs across all calls (calls would not be kill points at all in the analysis). Coarsening using this more aggressive strategy may potentially be performed in more cases, but as part of the tradeoff, the possibility of slowing down a program is left open by the addition of an excessive number of synchronization operations on commonly executed paths.

Locks on two different objects should not be coarsened across the same program point, as this may give rise to a deadlock if the original program assumed that the two objects would never be locked simultaneously. The deadlock avoidance strategy is as follows. Once all the locks for a particular value number and in the same equivalence class have been considered and coarsened, all the basic blocks in intersection set I are marked as containing virtual calls that are not guarded by inline guards. Such marking ensures that when the next object is considered for coarsening, the program range across which coarsening is done will be completely disjoint to the range across which coarsening was done in any prior cases. Thus, no two objects can be coarsened across the same range, i.e., the intersection of intersection sets I for the two objects must be empty.

Figure 8:
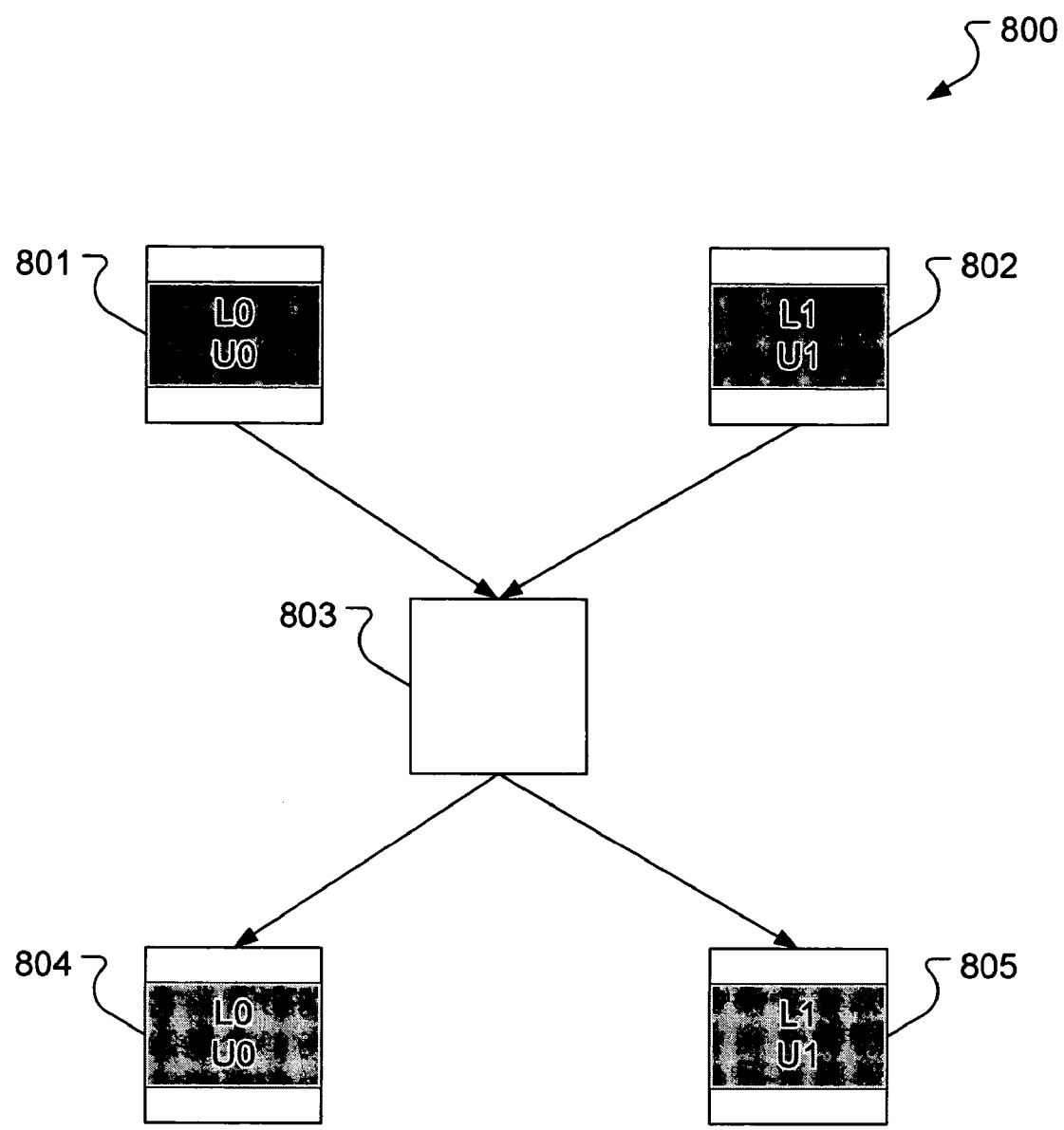
FIG. 8 illustrates an exemplary control flow graph wherein two objects are locked before and after and intermediate block, but not in the intermediate block.

The example control flow graph 800 of FIG. 8 assists in the illustration of this point. Syncexit operation U0 in block 801 may be coarsened with syncenter operation L0 in block 804 or syncexit operation U1 in block 802 may be coarsened with syncenter operation L1 in block 805, but not both.

Note that, since at most one object can be coarsened across a given range, it would make sense to use some heuristic to choose which object should be considered first for coarsening. A simple static heuristic is contemplated that considers objects (value numbers) in decreasing order of number of times the objects are locked/unlocked. Another, more precise, criterion could employ block profiles to select a given block as a coarsening candidate based on the profile of the given block indicating that the given block is on a hot control flow path, i.e., those candidates that are locked on hot control flow paths may be considered first.

In Java, many operations, such as array dereferences, field accesses, etc., require that the Java Virtual Machine perform "checks" (for index out of bounds and nullness respectively) before actually performing the operation. The appropriate exception/error is raised if a check fails. Control is passed to the appropriate exception handler within the method (if one exists), or the method is exited upon raising an exception. Consequently, it is necessary to ensure that the lock on an object is released (when an exception is raised in the coarsened range of instructions) before control is passed to appropriate exception handler code.

Figure 19:
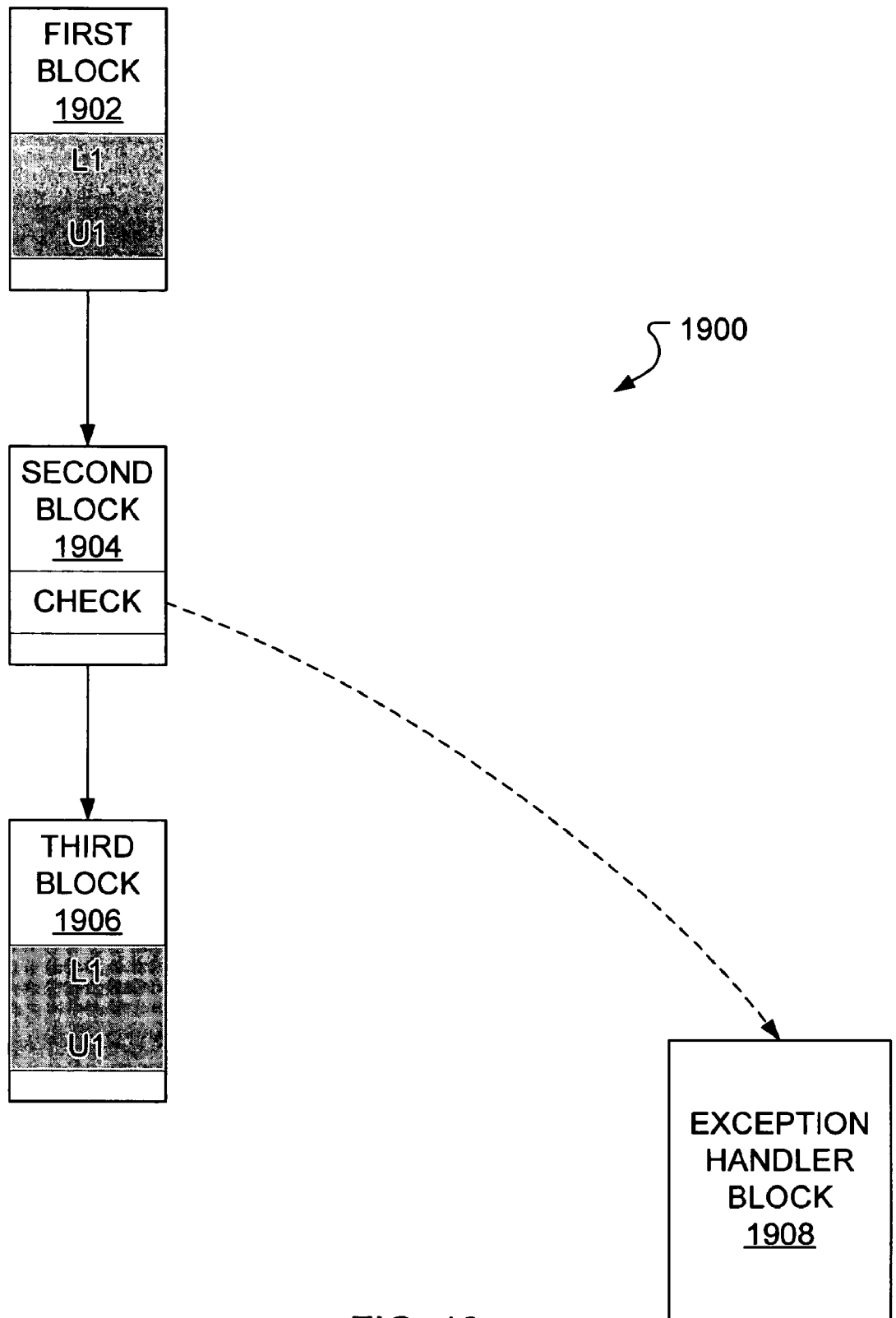
FIG. 19 illustrates an exemplary control flow graph wherein a first block and a third block include regions for synchronizing an object and an exception causing check is found in an intervening block.
Figure 20:
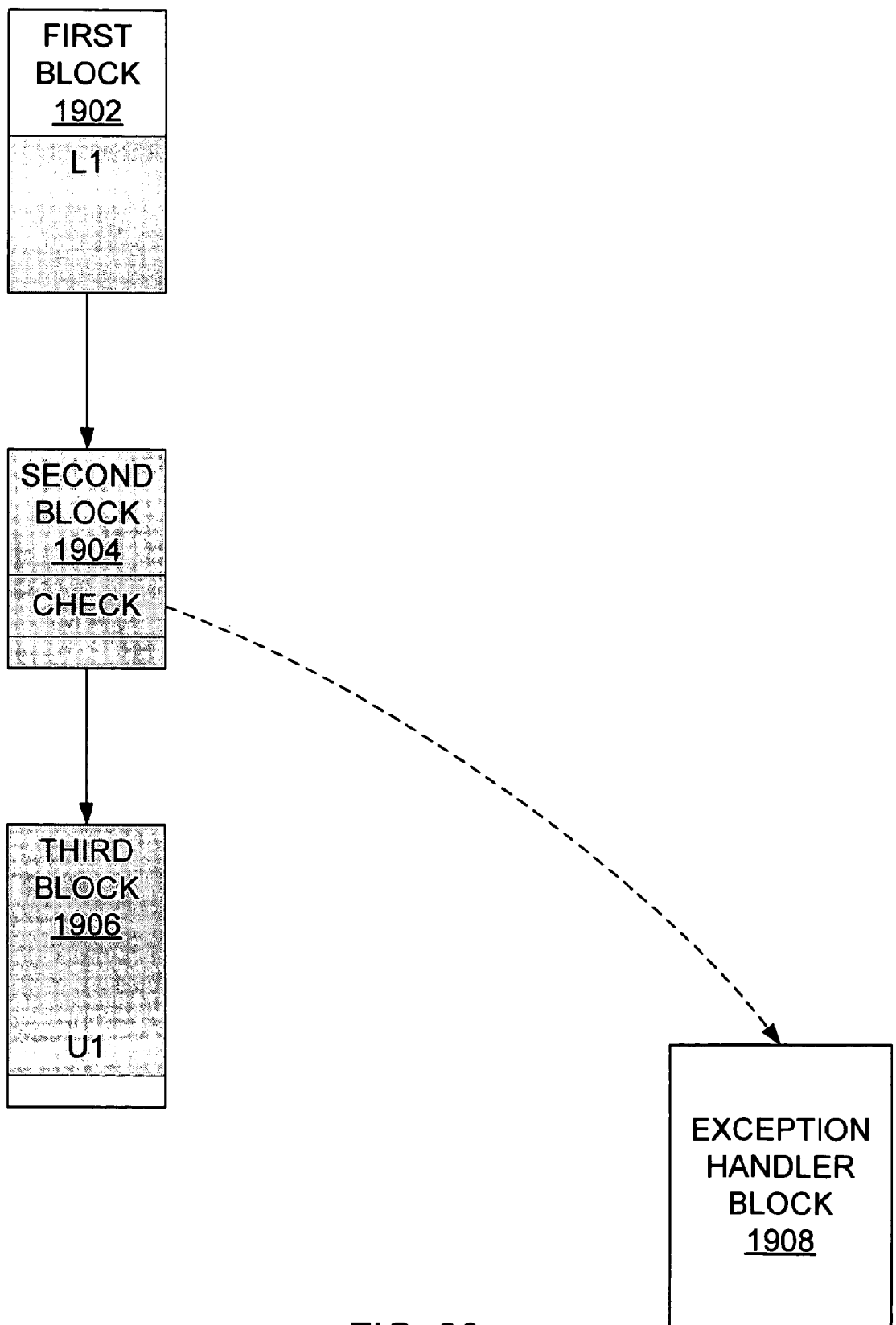
FIG. 20 illustrates an exemplary control flow graph adapted from the control flow graph of FIG. 19 wherein synchronization regions in the first and third block have been coarsened over the intervening block.
Figure 21:
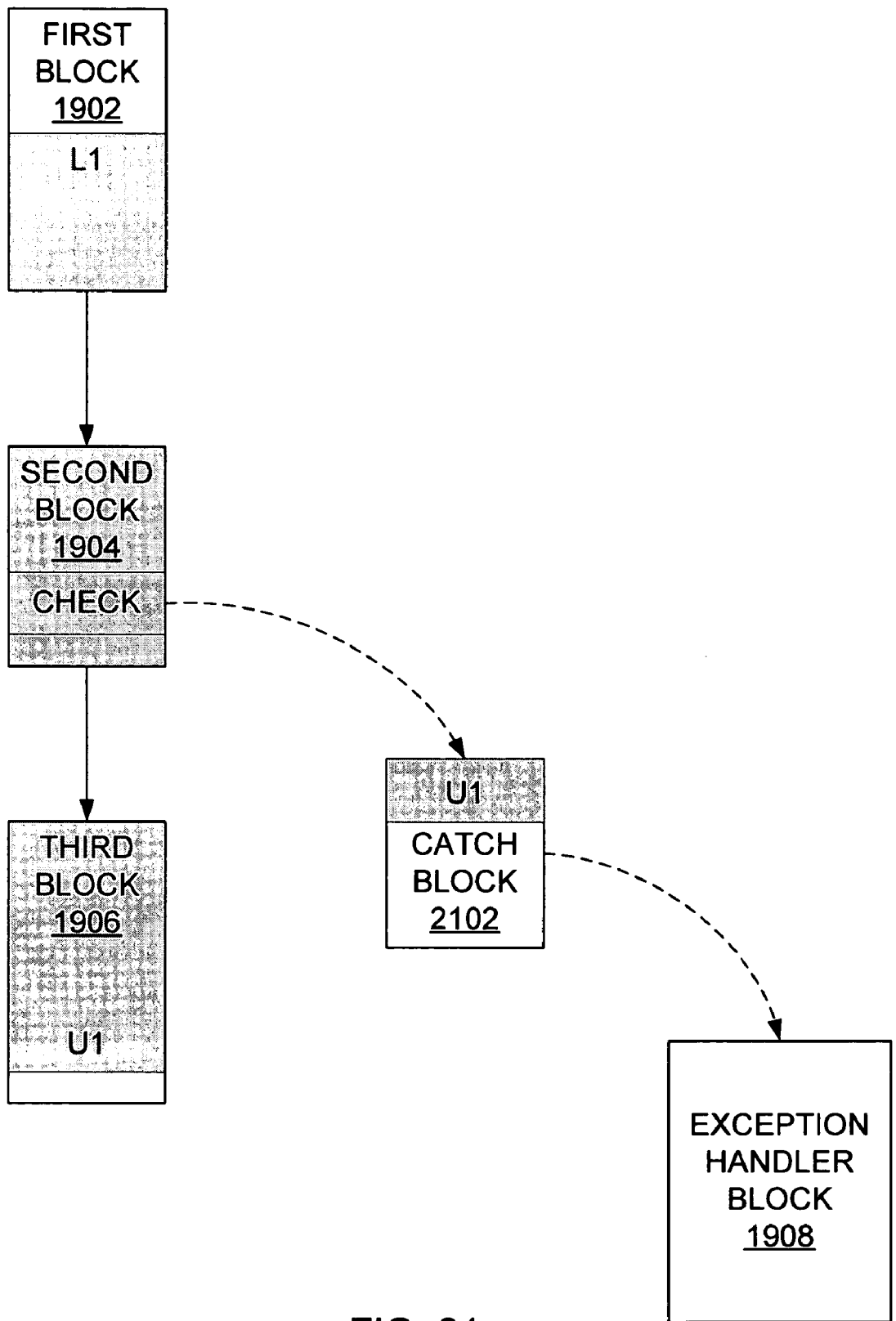
FIG. 21 illustrates an exemplary control flow graph adapted from the control flow graph of FIG. 20 wherein a catch block has been inserted between the intervening block and an exception handling block, according to an embodiment of the present invention.

In typical execution of the method represented by an exemplary control flow 1900, illustrated in FIG. 19, a first block 1902 is executed followed by a second block 1904, which includes a check that may raise an exception (an exception point), and a third block 1906. An exceptional flow edge connects the second block 1904 to an exception handler block 1908. The first block 1902 is considered, for the purposes of this example, to include a synchronization operation on a given object "1". Additionally, for the purposes of this example, the third block 1906 is considered to include a synchronization operation on object 1. If it is desired to coarsen between the first block 1902 and the third block 1906 across the exception point in the second block 1904, as illustrated in FIG. 20, the exceptional flow edge that connects the second block 1904 to the exception handler block 1908 must be considered. As illustrated in FIG. 21, a catch block 2102 may be added to catch an exception raised by the check, unlock the given object and re-throw the originally thrown exception. As such the catch block 2102 splits the exceptional edge flow from the second block 1904 to the exception handler block 1908.

To determine locations that may require such a catch block, a subset, E, of basic blocks in intersection set I that contain any potentially exception causing code ("checks") is determined. If the subset E contains at least one block, then a new catch block C may be add to the method. The artificially generated catch block C would be designed to catch every possible exception/error that can be raised in Java. For every basic block B in subset E, an exception control flow edge may be added from the block B to the artificially generated catch block C. In the artificially generated catch block C, the exception object thrown by block B is caught, the object that was locked across block B as a result of coarsening is unlocked and the exception object caught is re-thrown. Exception edges from the artificially generated catch block C may also be added to every catch block that was a potential handler for the code in block B. This has the effect of eventually reaching the exception handler code provided by the programmer, while maintaining the synchronization state upon entry to the exception handler code that was intended by the programmer.

Alternatively, lock coarsening may be avoided altogether across basic blocks that contain exception checks. However, it is believed that the number of opportunities to perform coarsening would be reduced in many cases, as exception checks arise from fairly common operations in Java.

Since coarsening is allowed between two program points at the same nesting depth within a given loop, then, in theory, coarsening could be performed (completely) over an inner loop. As mentioned hereinbefore, one of the constraints under which coarsening is performed requires that a lock not be held across a long running loop. This constraint is adhered to by considering GC yield points (at the back edge of an inner loop if the inner loop is not provably short running) as kill points for coarsening. Note that the second implementation has separate analyses that act to remove GC yield points from loops that are known to be short running. In such cases lock coarsening is allowed to occur.

If coarsening may be performed between a syncexit operation in a try region and a syncenter operation in a catch block, then coarsening is allowed to happen, but only under certain conditions. There cannot be any predecessor blocks of the catch block that are not present in intersection set I, implying that there are no entry points into the catch block from anywhere outside the coarsened range. This ensures that the locking depth is at least one (property in a locked region) and so an unlocking operation will not be attempted on an object that has not been locked. Note that, if a lock operation in a try region is coarsened with an unlock operation in a catch block, exception edges may be required to be added between the try block and the artificially generated catch block C (discussed hereinbefore), but the artificially generated catch block C is inserted after the coarsened catch block in the list of handlers that are searched sequentially at runtime in case an exception is raised in the try region. This ensures that the (locking) state of the object is consistent whether the coarsened catch block is, in fact, the executed handler or not.

As was the case in the first implementation, it is desired to avoid adding synchronization operations on an object whose reference may not be properly defined at the point in the code at which the synchronization operation is intended to be inserted. In the second lock coarsening implementation, guards may be inserted around the inserted syncenter operations and syncexit operations so that the inserted synchronization operations will not execute if the object reference is null. A following nullness analysis pass removes the guards if the object cannot be null at those points, as is expected to be the common case.

The two implementations described hereinbefore share two advantages: 1) the algorithms used are computationally inexpensive, passing over the code only once (the second implementation) or twice (the first implementation), and 2) aggressive lock coarsening is accomplished effectively and safely even in code that can generate exceptions. The first advantage is critically important since a Java JIT compiler executes at the same time as the program being compiled. The second advantage is also significant since exception handling is a widely used in Java programming.

As will be apparent to a person skilled in the art, the implementations differ in the amount of memory used. The first implementation uses bit vectors and arrays of synchronization depths whose size depends on the number of objects to which synchronization operations are applied in the method. Since there are normally few such objects, the amount of memory required per basic block is usually small and does not depend on the size of the method. The amount of memory required by the first implementation to perform lock coarsening is therefore proportional to the size of the method.

The second implementation, on the other hand, relies on several bit vectors whose length is determined by the number of basic blocks in the method, which implies that the amount of memory required is proportional to the square of the size of the method. For most Java methods, however, the amount of memory used by each implementation is unlikely to be a significant concern.

Advantageously, each of the implementations analyze the ongoing coarsening to determine where additional synchronization operations are to be added. Such addition of synchronization operations, where determined to be necessary, expands the scope of coarsening beyond the scope of typical approaches. Furthermore, coarsening may be performed over types of instructions coarsening over which has previously been avoided.

Other modifications will be apparent to those skilled in the art and, therefore, the invention is defined in the claims.

What is claimed is:

1. In a just-in-time compiler of program code, the program code including a plurality of blocks of instructions and the program code, when executed, performing repetitive synchronization on a plurality of objects, a method of optimizing said repetitive synchronization, said method comprising the steps of:
examining said program code to collect information about each block of said plurality of blocks to identify candidate locking operations and candidate unlocking operations in paths between an initial locking operation and a final unlocking operation, wherein said information includes a first subset, a second subset and a third subset of said plurality of blocks, where said first subset includes blocks that include a locking operation, said second subset includes blocks that include an unlocking operation, and said third subset includes blocks that succeed a given block;
analyzing said information to determine a set of synchronization operations to be removed, including:
selecting a given object of said plurality of objects, where said given object is repetitively synchronized;
selecting a given block, from said second subset, in which a unlocking operation on said given object is to be performed;
selecting a successor block, from an intersection of said first subset and said third subset, in which a locking operation on said given object is to be performed; and
adding said unlocking operation and said locking operation to said set of synchronization operations to be removed;
modifying the program code based on said set of synchronization operations to be removed, where said modifying includes inserting a new synchronization operation where necessitated by removing synchronization operations in said set.

2. The method of claim 1, further comprising the step of:
examining the program code in forward order to determine, at least for the beginning and end of each block of instructions, a flag indicating whether an earlier locking operation is to be performed on a given object.

3. The method of claim 2, wherein said step of examining the program code in forward order to determine a flag indicating whether an earlier locking operation is to be performed is performed for each instruction in said each block of instructions.

4. The method of claim 3, wherein said step of examining the program code in forward order further comprises, if a given instruction under consideration is a locking operation on said given object and said flag said flag indicating whether an earlier locking operation is to be performed on said given object is set, adding said given instruction to said set of synchronization operations to be removed.

5. The method of claim 4, further comprising the step of:
examining the program code in backward order to determine, at least for said beginning and end of said each block of instructions, a flag indicating whether a later unlocking operation is to be performed on said given object.

6. The method of claim 5, wherein said step of examining the program code in backward order to determine said flag indicating whether a later unlocking operation is to be performed is performed for each instruction in said each block of instructions.

7. The method of claim 6, wherein said step of examining the program code in backward order further comprises, if a further given instruction under consideration is an unlocking operation on said given object and said flag indicating whether a later unlocking operation is to be performed on said given object is set, adding said further given instruction to said set of synchronization operations to be removed.

8. The method of claim 7, wherein said flag indicating whether an earlier locking operation is to be performed and said flag indicating whether a later unlocking operation is to be performed are represented by a bit.

9. The method of claim 8, further comprising the steps of:
determining a new bit for said given object for said beginning and end of each said block, where said determining said new bit includes performing a logical AND operation on said bit indicating whether an earlier locking operation is to be performed on said given object and said bit indicating whether a later unlocking operation is to be performed on said given object; and
where said new bit for the beginning of a given block of said plurality of blocks differs from said new bit for a directly preceding block, inserting a corrective synchronization operation.

10. The method of claim 9, wherein said step of examining the program code in forward order further comprises identifying a synchronization operation for a particular object as a not legally coarsenable synchronization operation.

11. The method of claim 10, further comprising the step of:
removing candidate synchronization operations associated with said particular object from said set of synchronization operations to be removed.

12. The method of claim 11, wherein said step of modifying the program code further comprises removing from the program code each synchronization operation in said set of synchronization operations to be removed.

13. The method of claim 1, wherein said step of analyzing said information further comprises the substeps of:
determining a fifth subset of said plurality of blocks, where said fifth subset includes blocks that intervene said given block and said successor block; and
only performing said adding if all blocks in said fifth subset do not include features that limit lock coarsening opportunities.

14. The method of claim 13, wherein said subsets of selecting said given block is performed based on a ranking of said plurality of objects.

15. The method of claim 14, wherein said ranking of a particular object of said plurality of objects is based on a number of times said particular object is synchronized throughout said program code.

16. The method of claim 1, wherein said information includes a fourth subset of said plurality of blocks, where said fourth subset includes blocks that precede a given block.

17. The method of claim 16 wherein said step of analyzing said information further comprises the substeps of:
- selecting a given object of said plurality of objects, where said given object is repetitively synchronized;
- selecting a given block, from said first subset, in which a locking operation on said given object is performed;
- selecting a predecessor block, from an intersection of said second subset and said fourth subset, in which an unlocking operation on said given object is performed; and
- adding said locking operation and said unlocking operation to said set of synchronization operations to be removed.

18. The method of claim 17, wherein said step of analyzing said information further comprises the substeps of:
- determining a sixth subset of said plurality of blocks, where said seventh subset includes blocks that intervene said predecessor block and said given block; and
- only performing said adding if all blocks in said subset of said sixth type do not include features that limit lock coarsening opportunities.

19. A just-in-time compiler of program code stored on a computer readable tangible medium, said program code including a plurality of blocks of instructions and said program code, when executed, performing repetitive synchronization on a plurality of objects, said compiler configured to:
- examine said program code to collect information about each block of said plurality of blocks to identify candidate locking operations and candidate unlocking operations in paths between an initial locking operation and a final unlocking operation, wherein said information includes a first subset, a second subset and a third subset of said plurality of blocks, where said first subset includes blocks that include a locking operation, said second subset includes blocks that include an unlocking operation, and said third subset includes blocks that succeed a given block;
- analyze said information to determine a set of synchronization operations to be removed by
  - selecting a given object of said plurality of objects, where said given object is repetitively synchronized;
  - selecting a given block, from said second subset, in which a unlocking operation on said given object is to be performed;
  - selecting a successor block, from an intersection of said first subset and said third subset, in which a locking operation on said given object is to be performed; and
  - adding said unlocking operation and said locking operation to said set of synchronization operations to be removed;
- modify said program code based on said set of synchronization operations to be removed, where said modifying includes inserting a new synchronization operation where necessitated by removing synchronization operations in said set.

20. A computer readable tangible medium containing computer-executable instructions which, when performed by a processor in a computer system, cause said computer system to:
- examine a listing of program code, said program code including a plurality of blocks of instructions and said program code, when executed, performing repetitive synchronization on a plurality of objects, to collect information about each block of said plurality of blocks to identify candidate locking operations and candidate unlocking operations in paths between an initial locking operation and a final unlocking operation, wherein said information includes a first subset, a second subset and a third subset of said plurality of blocks, where said first subset includes blocks that include a locking operation, said second subset includes blocks that include an unlocking operation, and said third subset includes blocks that succeed a given block;
- analyze said information to determine a set of synchronization operations to be removed by
  - selecting a given object of said plurality of objects, where said given object is repetitively synchronized;
  - selecting a given block, from said second subset, in which a unlocking operation on said given object is to be performed;
  - selecting a successor block, from an intersection of said first subset and said third subset, in which a locking operation on said given object is to be performed; and
  - adding said unlocking operation and said locking operation to said set of synchronization operations to be removed; and
- modify said program code based on said set of synchronization operations to be removed, where said modifying includes inserting a new synchronization operation where necessitated by removing synchronization operations in said set.

* * * * *